US010565866B2

(12) United States Patent
Gao

(10) Patent No.: US 10,565,866 B2
(45) Date of Patent: Feb. 18, 2020

(54) ACQUISITION DEVICE, RECOGNITION DEVICE, VEHICLE IDENTIFICATION SYSTEM AND METHOD

(71) Applicant: BOE TECHNOLOGY GROUP CO., LTD., Beijing (CN)

(72) Inventor: Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/550,725

(22) PCT Filed: Mar. 20, 2017

(86) PCT No.: PCT/CN2017/077274
§ 371 (c)(1),
(2) Date: Aug. 11, 2017

(87) PCT Pub. No.: WO2017/215301
PCT Pub. Date: Dec. 21, 2017

(65) Prior Publication Data
US 2019/0096241 A1     Mar. 28, 2019

(30) Foreign Application Priority Data
Jun. 17, 2016   (CN) .......................... 2016 1 0440235

(51) Int. Cl.
*G08G 1/14*     (2006.01)
*G08G 1/04*     (2006.01)
(Continued)

(52) U.S. Cl.
CPC ................. *G08G 1/04* (2013.01); *B60Q 1/56* (2013.01); *G06F 21/44* (2013.01); *G08G 1/017* (2013.01); *G08G 1/149* (2013.01)

(58) Field of Classification Search
CPC ........ G08G 1/04; G08G 1/017; G08G 1/1499; G08G 1/149; B60Q 1/00; B60Q 1/56; B60Q 9/00; G06F 21/44
See application file for complete search history.

(56) References Cited

U.S. PATENT DOCUMENTS 5,422,473 A * 6/1995 Kamata .............. G06K 17/0022
235/384
6,152,588 A * 11/2000 Scifres ................ B60Q 1/0011
362/231
(Continued)

FOREIGN PATENT DOCUMENTS

| CN | 102682607 A | 9/2012 |
| CN | 103106797 A | 5/2013 |

(Continued)

OTHER PUBLICATIONS

1st Office Action dated Mar. 5, 2018 in CN201610440235.1.
International Search Report and Written Opinion dated Jun. 5, 2017 in PCT/CN2017/077274.

*Primary Examiner* — Nay Tun
(74) *Attorney, Agent, or Firm* — Syncoda LLC; Feng Ma

(57) ABSTRACT

A vehicle identification system includes an acquisition device and a recognition device. The acquisition device is mounted on a first vehicle and includes an acquisition circuit configured to obtain identification information of the first vehicle; and an optical signal transmitting circuit configured to generate and transmit a first optical signal corresponding to the identification information of the first vehicle. The recognition device includes an optical signal receiving circuit configured to receive a first optical signal emitted from the first vehicle, and a recognition circuit configured to determine the identification information of the first vehicle based on the first optical signal. A vehicle identification includes transmitting a first optical signal corresponding to
(Continued)

identification information of a first vehicle; and determining the identification information of the first vehicle based on the first optical signal.

29 Claims, 19 Drawing Sheets

(51) Int. Cl.
*G08G 1/017* (2006.01)
*G06F 21/44* (2013.01)
*B60Q 1/56* (2006.01)

(56) References Cited

U.S. PATENT DOCUMENTS

| | | | | |
|---|---|---|---|---|
| 6,892,942 | B1* | 5/2005 | Widl | G08G 1/017 235/384 |
| 8,831,800 | B2* | 9/2014 | Parienti | G05D 1/0234 701/19 |
| 9,853,729 | B2* | 12/2017 | Endo | H04B 10/1123 |
| 2003/0200227 | A1* | 10/2003 | Ressler | G08G 1/017 |
| 2006/0102759 | A1* | 5/2006 | DeLong | B05B 12/12 239/602 |
| 2009/0299857 | A1* | 12/2009 | Brubaker | G06Q 30/02 705/14.66 |
| 2010/0280688 | A1* | 11/2010 | Eckhoff | B60K 6/46 701/22 |
| 2012/0044066 | A1* | 2/2012 | Mauderer | B60T 7/22 340/479 |
| 2015/0349885 | A1* | 12/2015 | Endo | H04B 10/1123 398/130 |
| 2016/0097648 | A1* | 4/2016 | Hannah | G06K 9/00785 701/118 |
| 2016/0260269 | A1* | 9/2016 | Pietschmann | G06Q 30/02 |
| 2017/0227972 | A1* | 8/2017 | Sabau | G05D 1/024 |

FOREIGN PATENT DOCUMENTS

| | | | |
|---|---|---|---|
| CN | 103434484 A | | 12/2013 |
| CN | 104700132 A | * | 6/2015 |
| CN | 105245279 A | | 1/2016 |
| CN | 104700132 A | | 6/2016 |
| DE | 102014001836 A1 | | 8/2014 |

* cited by examiner

ACQUISITION DEVICE, RECOGNITION DEVICE, VEHICLE IDENTIFICATION SYSTEM AND METHOD

CROSS-REFERENCE TO RELATED APPLICATION

The present application claims priority to Chinese Patent Application No. 201610440235.1 filed on Jun. 17, 2016, the disclosure of which is hereby incorporated by reference in its entirety.

TECHNICAL FIELD

The present disclosure relates generally to vehicle identification technologies, and more specifically to an acquisition device, a recognition device, a vehicle identification system, and a vehicle identification method.

BACKGROUND

Currently more and more vehicles, including cars and trucks, are running on the road, and as such there are great needs to recognize and manage identification of these vehicles for a variety of occasions (for example, at parking lots, or at toll stations).

In a typical vehicle identification method that is widely employed in many current technologies, a camera arranged at an entrance captures an image of a license plate (typically a combination of characters, letters, and numbers) of a vehicle. Then the image is analyzed by a license plate identification device to thereby extract the license plate number. Next the license plate number of the vehicle that has been extracted from the image is compared with records of license plate numbers pre-stored in a database: if any record in the database matches with the license plate number of the vehicle, the identification information of the vehicle can thus be successfully recognized, whereas if no matching record is found in the database, the identification information of the vehicle cannot be recognized.

However, the vehicle identification method as described above has a high requirement for the distance for recognition. Typically, the distance between the vehicle and the camera at the entrance needs to be sufficiently short to allow the camera to clearly capture images of license plate numbers of the vehicles. As such, the above vehicle identification method has significant limitations in real practice.

SUMMARY

In order to address the aforementioned issue of the vehicle identification method commonly employed in current vehicle identification technologies, the present disclosure provides an acquisition device, a recognition device, a vehicle identification system, and a vehicle identification method.

In a first aspect, an acquisition device is disclosed.

The acquisition device is mounted on a first vehicle and comprises an acquisition circuit and an optical signal transmitting circuit. The acquisition circuit is configured to obtain identification information of the first vehicle; and the optical signal transmitting circuit is configured to generate and transmit a first optical signal corresponding to the identification information of the first vehicle.

In some embodiments of the acquisition device, the acquisition circuit is further configured to generate, and send to the optical signal transmitting circuit, a first identification electrical signal based on the identification information of the first vehicle, and the optical signal transmitting circuit is configured to generate the first optical signal based on the first identification electrical signal.

In the acquisition device as mentioned above, the identification information of the first vehicle can comprise at least one of code information of the first vehicle or identification information of a first driver on the first vehicle. Herein, the code information of the first vehicle can include at least one of a license plate number associated with the first vehicle or a vehicle identification number (VIN) associated with the first vehicle, and the identification information of the first driver on the first vehicle can include at least one of fingerprint information, iris information, or voice information.

In some embodiments of the acquisition device, the identification information of the first vehicle includes both the code information of the first vehicle and the identification information of the first driver on the first vehicle, and the acquisition circuit comprises at least one processing subcircuit and a combining subcircuit. The at least one processing subcircuit is configured to convert the code information of the first vehicle into a first electrical signal, and to convert the identification information of the first driver on the first vehicle into a second electrical signal. The combining subcircuit is configured to generate the first identification electrical signal based on the first electrical signal and the second electrical signal received from the at least one processing subcircuit.

According to some embodiments, the at least one processing subcircuit as described above includes a first processing subcircuit and a second processing subcircuit, wherein the first processing subcircuit is configured to convert the code information of the first vehicle into the first electrical signal, and the second processing subcircuit is configured to convert the identification information of the first driver on the first vehicle into a second electrical signal.

In some other embodiments of the acquisition device, the identification information of the first vehicle includes both the code information of the first vehicle and the identification information of the first driver on the first vehicle, and the acquisition circuit comprises a processing subcircuit, which is configured to combine the code information of the first vehicle and the identification information of the first driver on the first vehicle to thereby obtain combined identification information of the first vehicle. Herein the first identification electrical signal can be generated based on the combined identification information of the first vehicle.

In yet some other embodiments of the acquisition device, the identification information of the first vehicle comprises the identification information of the first driver on the first vehicle, and the acquisition circuit comprises an acquisition subportion, a recognition subportion, and a converting subportion.

The acquisition subportion is configured to obtain, and to send to the recognition subportion, the identification information of the first driver on the first vehicle.

The recognition subportion is configured to query the identification information of the first driver in a first database comprising at least one record of identification information of at least one driver, wherein each record corresponds to each driver, and is also configured to send the identification information of the first driver on the first vehicle to the converting subportion if the identification information of the first driver matches with any record in the first database.

The converting subportion is configured to convert the identification information of the first driver on the first vehicle into an electrical signal corresponding to the identification information of the first driver on the first vehicle.

In the acquisition device as mentioned above, if the identification of the first driver fails to match with any record in the first database, the recognition subportion can be further configured to send a control signal to a controller of the first vehicle such that the controller prohibits the first vehicle from being started upon receiving the control signal, or be further configured to generate, and to send to a mobile terminal associated with a second driver whose identification information is in the first database, an authorization prompt such that the second driver determines whether or not to authorize the first driver for driving the first vehicle, and to add a record of the identification information of the first driver in the first database upon receiving an authorization message from the mobile terminal.

According to some embodiments of the present disclosure, the optical signal transmitting circuit of the acquisition device can include a third processing subcircuit and an optical transmitter. Herein, the third processing subcircuit is configured to modulate the first identification electrical signal to thereby generate, and to send to the optical transmitter, a modulated first identification electrical signal, and the optical transmitter is configured to transmit the first optical signal based on the modulated first identification electrical signal. The optical transmitter can preferably comprise a vehicle lamp, but can also be an independent vehicle-mounted equipment.

In the embodiments of the acquisition device as described above, the optical signal transmitting circuit can further include an optical signal receiving subcircuit, which is configured to receive a second optical signal transmitted from, and corresponding to identification information of, a second vehicle immediately behind the first vehicle, and to convert the second optical signal into a third electrical signal; the acquisition circuit can be further configured to encrypt the first identification electrical signal to thereby generate an encrypted identification electrical signal, and to generate a second identification electrical signal based on the third electrical signal and the encrypted first identification electrical signal; the third processing subcircuit can be further configured to modulate the second identification electrical signal to generate a modulated second identification electrical signal; and the optical transmitter is further configured to transmit an optical signal corresponding to the identification information of the first vehicle and the identification of the second vehicle based on the modulated second identification electrical signal.

In a second aspect, the present disclosure further provides a recognition device for determining identification information of a first vehicle.

The recognition device comprises an optical signal receiving circuit and a recognition circuit. The optical signal receiving circuit is configured to receive a first optical signal emitted from the first vehicle, and the recognition circuit is configured to determine the identification information of the first vehicle based on the first optical signal.

In some embodiments of the recognition device, the optical signal receiving circuit is further configured to convert the first optical signal to a fourth electrical signal, and the recognition circuit is further configured to determine the identification information of the first vehicle based on the fourth electrical signal.

In the recognition device as described above, the recognition circuit can include a first recognition subcircuit, a first control subcircuit, and a first execution subcircuit. The first recognition subcircuit is configured to determine the identification information of the first vehicle based on the fourth electrical signal, and the first control subcircuit is configured to control the first execution subcircuit to perform a first action based on the identification information of the first vehicle.

According to some embodiments, the first recognition subcircuit can be configured to extract ID information based on the fourth electrical signal, to query the ID information in a second database comprising at least one record of initial identification information of at least one vehicle, wherein each record corresponding to each vehicle, and to generate an instruction based on whether or not the ID information matches with any record in the second database. The first control subcircuit can be configured, upon receiving the instruction from the first recognition subcircuit, to control the first execution subcircuit to perform the first action.

In some embodiments of the recognition device, the first recognition subcircuit comprises a gating subportion, which is configured to allow or prohibit a vehicle to pass by or through. Herein the gating subportion can be, for example, a cross-bar, a gate, or a garage door, but can also comprise an equipment with a gating functionality.

In some embodiments of the recognition device, the recognition circuit comprises a separation subcircuit and a second recognition subcircuit. The separation subcircuit is configured to obtain one electrical signal corresponding to the first vehicle and another electrical signal corresponding to a second vehicle based on the fourth electrical signal, and the second recognition subcircuit is configured to determine the identification information of the first vehicle and the identification information of the second vehicle based respectively on the one electrical signal corresponding to the first vehicle and the another electrical signal corresponding to the second vehicle.

In the recognition device as mentioned above, the recognition circuit can further include a second control subcircuit and a second execution subcircuit, wherein the second control subcircuit is configured to control the second execution subcircuit to perform a second action based on the identification information of the first vehicle and the identification information of the second vehicle.

In a third aspect, the present disclosure further provides a vehicle identification system.

The vehicle identification system comprises an acquisition device according to any one of the embodiments as described above, and further comprises a recognition device according to any one of the embodiments as described above.

In a fourth aspect, the present disclosure further provides a vehicle identification method.

The vehicle identification method comprising: transmitting a first optical signal corresponding to identification information of a first vehicle; and determining the identification information of the first vehicle based on the first optical signal.

According to some embodiments of the present disclosure, prior to the transmitting a first optical signal corresponding to identification information of a first vehicle, the vehicle identification method further comprises generating a first identification electrical signal based on the identification information of the first vehicle; and generating the first optical signal based on the first identification electrical signal.

In the vehicle identification method as described above, the generating the first optical signal based on the first identification electrical signal can comprise: modulating the first identification electrical signal to obtain a modulated first identification electrical signal; and generating the first optical signal based on the modulated first identification electrical signal.

In the vehicle identification method as described above, the identification information of the first vehicle can comprise at least one of code information of the first vehicle or identification information of a first driver on the first vehicle. Herein, the code information of the first vehicle can include at least one of a license plate number associated with the first vehicle or a vehicle identification number (VIN) associated with the first vehicle, and the identification information of the first driver on the first vehicle can include at least one of fingerprint information, iris information, or voice information.

In some embodiments of the vehicle identification method, the identification information of the first vehicle comprises both the code information of the first vehicle and the identification information of the first driver on the first vehicle, and the generating a first identification electrical signal based on the identification information of the first vehicle comprises: generating a first electrical signal and a second electrical signal based respectively on the code information of the first vehicle and the identification information of the first driver on the first vehicle; and generating the first identification electrical signal based on the first electrical signal and the second electrical signal.

In some embodiments of the vehicle identification method, the identification information of the first vehicle comprises both the code information of the first vehicle and the identification information of the first driver on the first vehicle, and the generating a first identification electrical signal based on the identification information of the first vehicle comprises: combining the code information of the first vehicle and the identification information of the first driver on the first vehicle to thereby obtain combined identification information of the first vehicle; and generating the first identification electrical signal based on the combined identification information of the first vehicle.

According to some embodiments of the present disclosure, the identification information of the first vehicle comprises the identification information of the first driver on the first vehicle, and prior to the generating a first identification electrical signal based on the identification information of the first vehicle, the vehicle identification method further comprises: obtaining the identification information of the first driver on the first vehicle; and querying the identification information of the first driver on the first vehicle in a first database comprising at least one record of identification information of at least one driver, wherein each record corresponds to each driver.

In the vehicle identification method as described above, the identification information of the first driver on the first vehicle matches with any record in the first database, and accordingly the generating a first identification electrical signal based on the identification information of the first vehicle comprises: generating a second electrical signal based on the identification information of the first driver on the first vehicle.

In the vehicle identification method as described above, the identification information of the first driver on the first vehicle fails to match with any record in the first database, and accordingly the vehicle identification method further comprises: prohibiting the first driver from starting the first vehicle; or authorizing the first driver to drive the first vehicle.

Herein the authorizing the first driver to drive the first vehicle can include: generating an authorization prompt; sending the authorization prompt to a mobile terminal associated with a second driver, wherein the first database comprises a record of identification information of the second driver; and adding a record of the identification information of the first driver in the first database upon receiving an authorization message from the mobile terminal.

According to some embodiments of the present disclosure, the identification information of the first vehicle further comprises identification information of a second vehicle immediately behind the first vehicle. Accordingly, between the generating a first identification electrical signal based on the identification information of the first vehicle and the generating the first optical signal based on the first identification electrical signal, the vehicle identification method further comprises: generating a third electrical signal based on the identification information of the second vehicle and encrypting the first identification electrical signal to obtain an encrypted first identification electrical signal; and generating a first identification electrical signal based on the third electrical signal and the encrypted first identification electrical signal.

Herein the generating a third electrical signal based on the identification information of the second vehicle and encrypting the first identification electrical signal to obtain an encrypted first identification electrical signal can comprise: receiving a second optical signal transmitted from, and corresponding to the identification information of, the second vehicle; and generating the third electrical signal based on the second optical signal.

In some embodiments of the vehicle identification method, the determining the identification information of the first vehicle based on the first optical signal comprises: generating a fourth electrical signal based on the first optical signal; and determining the identification information of the first vehicle based on the fourth electrical signal.

In the vehicle identification method as described above, the determining the identification information of the first vehicle based on the fourth electrical signal can include: obtaining ID information from the fourth electrical signal; and determining the identification information of the first vehicle by querying the ID information in a second database comprising at least one record of initial identification information of at least one vehicle, wherein each record corresponds to each vehicle.

In the vehicle identification method as described above, the determining the identification information of the first vehicle based on the fourth electrical signal can alternatively include: obtaining one electrical signal corresponding to the first vehicle and another electrical signal corresponding to a second vehicle based on the fourth electrical signal; and determining the identification information of the first vehicle and the identification information of the second vehicle based respectively on the one electrical signal corresponding to the first vehicle and the another electrical signal corresponding to the second vehicle.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent according to these drawings.

DETAILED DESCRIPTION

In the following, with reference to the drawings of various embodiments disclosed herein, the technical solutions of the embodiments of the disclosure will be described in a clear and fully understandable way.

It is obvious that the described embodiments are merely a portion but not all of the embodiments of the disclosure. According to the described embodiments of the disclosure, those ordinarily skilled in the art can obtain other embodiment(s), which come(s) within the scope sought for protection by the disclosure.

In order to address the issues in current vehicle identification technologies, the present disclosure provides a vehicle identification method and a system, a vehicle recognition device and an acquisition device utilized therein.

In a first aspect, a vehicle identification method is provided.

Figure 1:
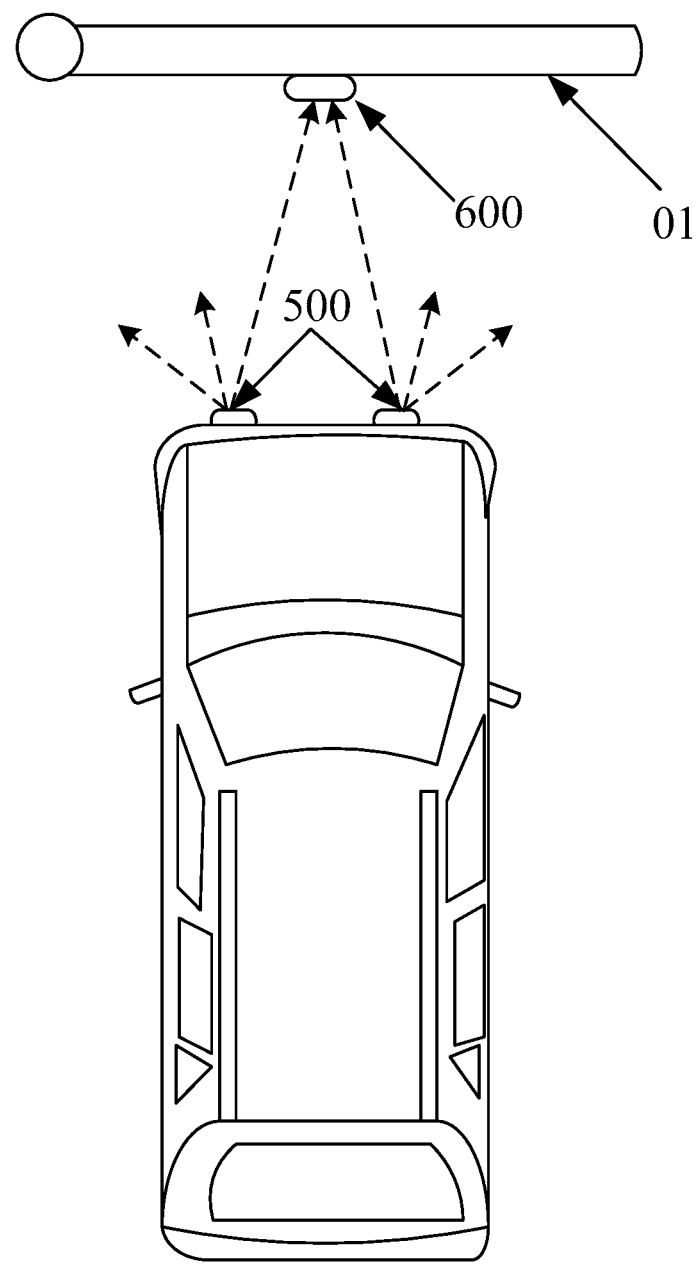
FIG. 1 illustrates a vehicle identification system according to some embodiments of the present disclosure.

FIG. 1 illustrates a vehicle identification system according to some embodiments of the present disclosure. As shown in the figure, the vehicle identification system comprises an acquisition device 500 and a recognition device 600. The acquisition device 500 is disposed on a vehicle, and the recognition device 600 is disposed on an intercept lever 01, which is configured to permit or forbid vehicles to pass thereby.

The acquisition device 500 is configured to obtain identification information of a vehicle, and then to transmit an optical signal to the recognition device 600, wherein the optical signal corresponds to the identification information of the vehicle. The recognition device 600 is configured to determine the identification information of the vehicle based on the optical signal.

Figure 2:
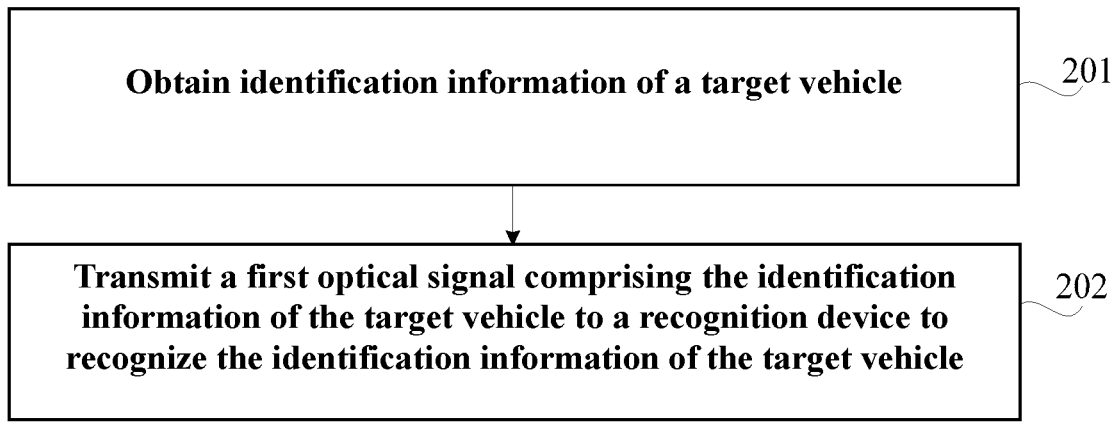
FIG. 2 is a flow chart of a vehicle identification method according to a first embodiment of the present disclosure.

The present disclosure also provides a vehicle identification method employing the acquisition device 500 as described above. FIG. 2 illustrates a vehicle identification method according to some embodiments of the present disclosure. As shown in FIG. 2, the vehicle identification method comprises:

Step 201: obtaining identification information of a target vehicle (i.e., a first vehicle);

Step 202: transmitting a first optical signal comprising the identification information of the target vehicle to a recognition device such that the recognition device can determine the identification information of the target vehicle based on the first optical signal.

In the vehicle identification method as described above, an optical signal comprising the identification information of a vehicle is transmitted to the recognition device to thereby allow the recognition device to be able to determine the identification information of the vehicle based on the optical signal. Because an optical signal typically has a relatively long transmission distance and a relatively strong direction, compared with current technologies, the vehicle identification method as described above is thus capable of determining the identification information of a vehicle even when there is a long distance between the vehicle and the recognition device. As such, vehicle identification method has an improved vehicle identification capability.

Figure 3:
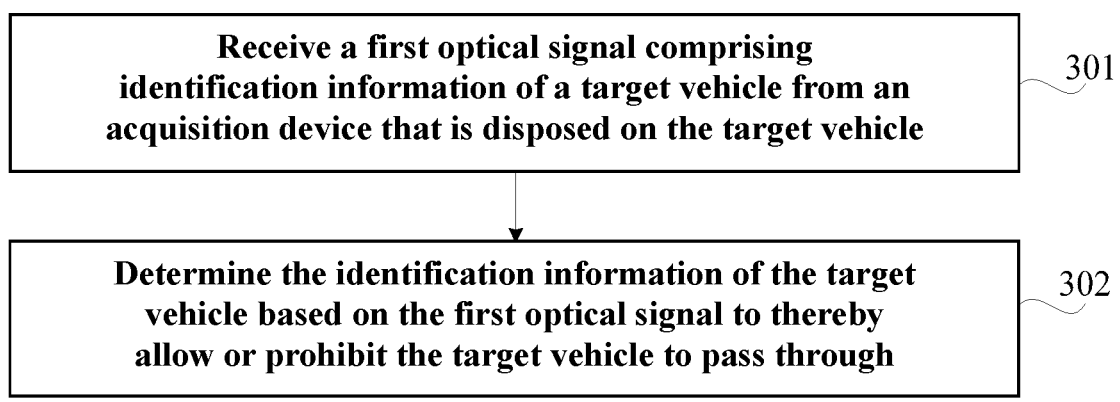
FIG. 3 is a flow chart of a vehicle identification method according to a second embodiment of the present disclosure.

The present disclosure further provides another embodiment of a vehicle identification method employing the recognition device 600 as described above, as illustrated in FIG. 3. The method comprises:

Step 301: receiving a first optical signal comprising the identification information of a target vehicle from an acquisition device disposed on the target vehicle;

Step 302: determining the identification information of the target vehicle based on the first optical signal to thereby allow or prohibit the target vehicle to pass through.

In the vehicle identification method as described above, an optical signal comprising the identification information of a vehicle that is obtained by an acquisition device, is utilized to determine the identification information of the vehicle. Because an optical signal typically has a relatively long transmission distance and a relatively strong direction, compared with current technologies, the vehicle identification method disclosed herein is capable of determining the identification information of a vehicle even when there is a long distance between the vehicle and the recognition device. As such, vehicle identification method has an improved vehicle identification capability.

Figure 4A:
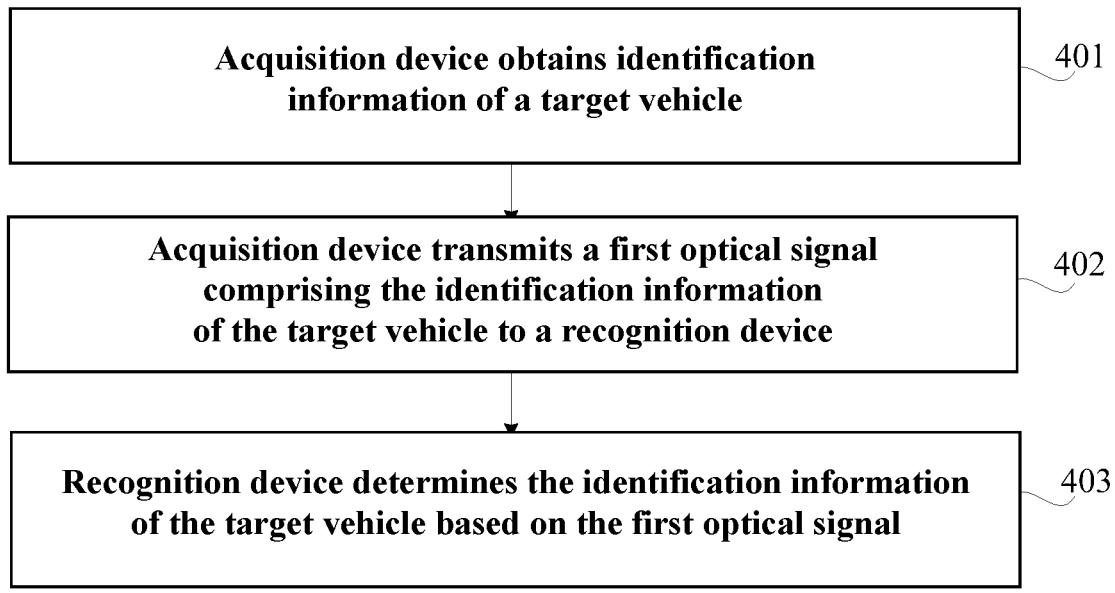
FIG. 4A is a flow chart of a vehicle identification method according to a third embodiment of the present disclosure.

The present disclosure further provides another embodiment of a vehicle identification method, illustrated in FIG. 4A. The method comprises the following steps.

Step 401: an acquisition device obtains identification information of a target vehicle;

In the method as described above, the acquisition device can be disposed on the target vehicle. The identification information of the target vehicle can be code information of the target vehicle, and can be for example, a license plate number assigned to the target vehicle, or can be a vehicle identification number (VIN) assigned to the target vehicle by the manufacturer.

Herein the license plate number refers to a code displayed on a license plate that is disposed on a front side and/or a rear side of a target vehicle, wherein the code can be a combination of letters, characters, and numbers, and shall uniquely correspond to, and represent, each individual vehicle. The vehicle identification number (VIN) typically comprises a 17-digit alphanumeric code that contains information regarding the manufacturer, a manufacturing year, a style, an engine code, an assembly location, etc.

Step 402: the acquisition device transmits a first optical signal comprising the identification information of the target vehicle to a recognition device;

Herein the acquisition device can transmit the first optical signal that corresponds to the identification information of the target vehicle to the recognition device, such that the recognition device can determine the identification information of the target vehicle based on the first optical signal.

Figure 4B:
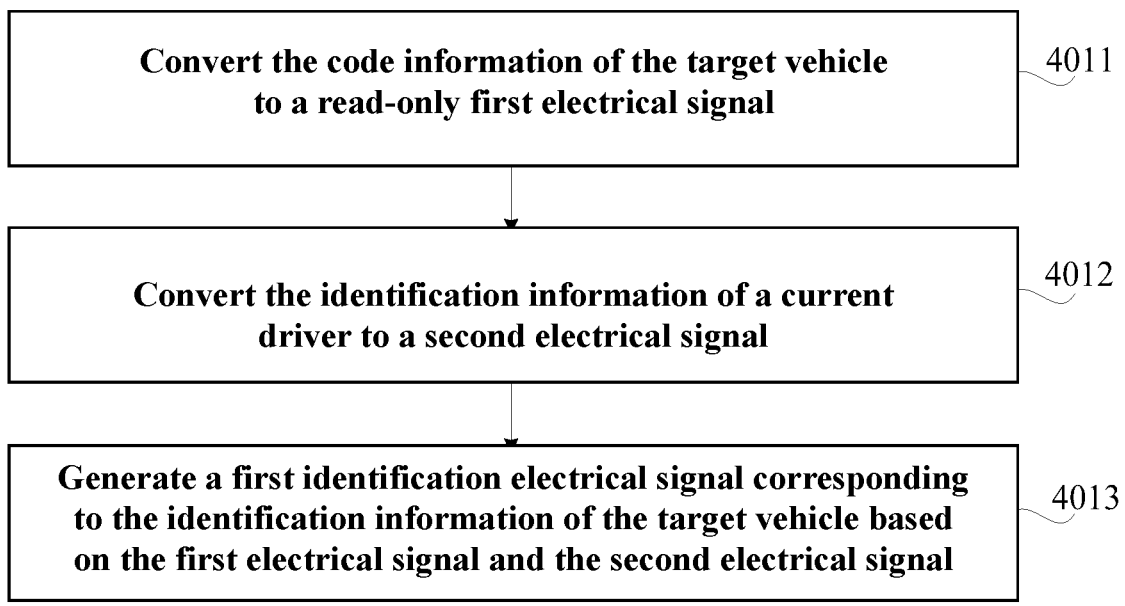
FIG. 4B is a flow chart of obtaining identification information of a target vehicle in the vehicle identification method according to some embodiment of the present disclosure.
Figure 4C:
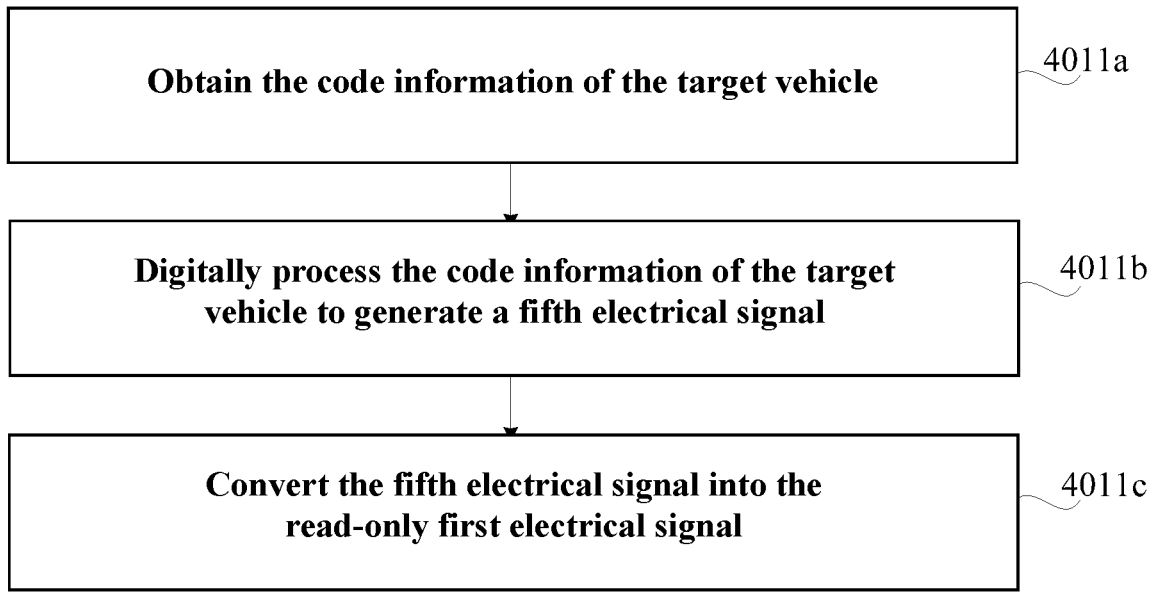
FIG. 4C is a flow chart of converting the code information of the target vehicle to a first electrical signal in the vehicle identification method according to some embodiment of the present disclosure.

In cases where a target vehicle is passing through a garage door or a gated entrance, as illustrated in FIG. 4B, Step 401 of the vehicle identification method can comprise the following steps:

Step 4011: converting the code information of the target vehicle to a read-only first electrical signal;

Optionally in some embodiments of the vehicle identification method, as shown in FIG. 4C, Step 4011 can comprise the following steps:

Step 4011a: obtaining the code information of the target vehicle.

Herein the code information of the target vehicle can be a license plate number or a vehicle identification number (VIN), which can be obtained by the acquisition device.

Step 4011b: digitally processing the code information of the target vehicle to thereby generate a fifth electrical signal.

Herein the acquisition device can perform a processing over the code information of the target vehicle to thereby obtain the fifth electrical signal. In one example, the fifth electrical signal can be a digital electrical signal, and can be obtained by converting the code information of the target vehicle through a digital circuit in the acquisition device.

Step 4011c: converting the fifth electrical signal into the read-only first electrical signal.

After the acquisition device converts the code information of a target vehicle into a fifth electrical signal, the acquisition device further solidifies the fifth electrical signal into a read-only first electrical signal. As such, the first electrical signal includes solidified, read-only, and extractable identification information (for example, VIN) of the target vehicle.

Figure 4D:
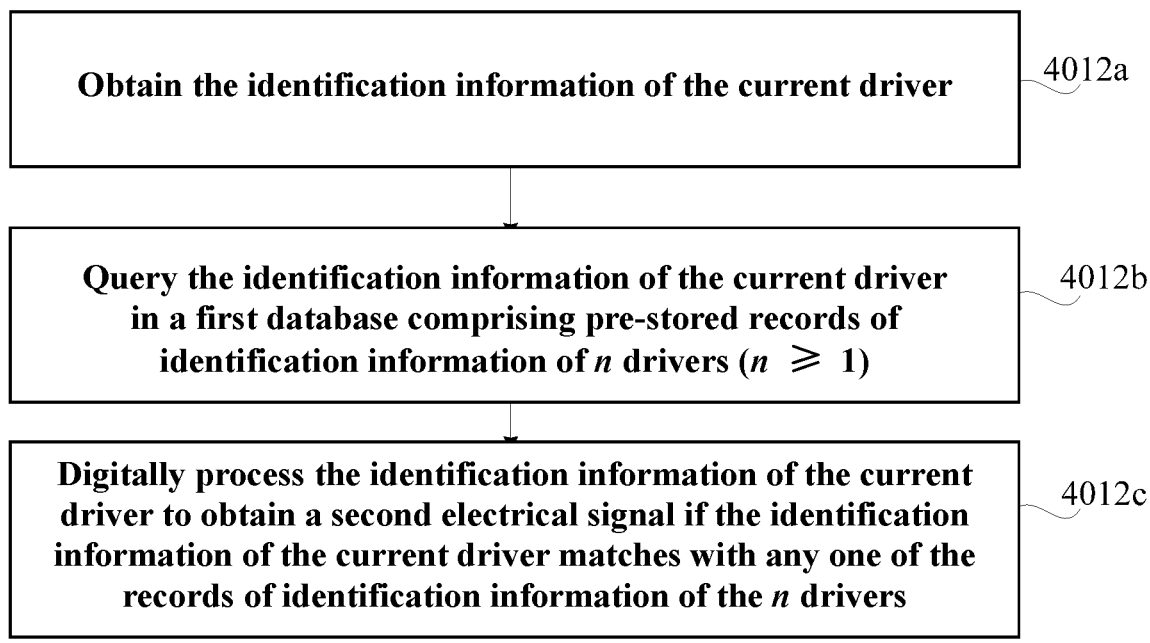
FIG. 4D is a flow chart of converting the identification information of a current driver to a second electrical signal in the vehicle identification method according to some embodiment of the present disclosure.

Step 4012: converting identification information of a current driver to a second electrical signal;

As shown in FIG. 4D, in some embodiments of the vehicle identification method, Step 4012 can comprise the following steps:

Step 4012a: obtaining the identification information of the current driver;

In order to improve the practicability and convenience of the vehicle identification method, the identification information of the current driver can comprise fingerprint information, iris information, or voice information, etc. of the current driver. The specific processes to collect the fingerprint information, the iris information, and the voice information can reference to existing technologies, and there are no limitations herein.

Step 4012b: querying the identification information of the current driver in a first database comprising records of identification information of n drivers, where n≥1;

Herein the first database is configured to store records of the identification information of n drivers. One single vehicle can correspond to a plurality of drivers who, for example, can be multiple members in a family. The first database can be arranged or configured in the acquisition device or in a remote cloud.

Assuming the first database comprises pre-stored records of the identification information of two drivers, A and B. If the identification information of the current driver is A, the acquisition device is thus able to determine that the identification information of the current driver matches with one pre-stored record in the first database. Yet if the identification information of the current driver is C, the acquisition device is thus able to determine that the identification information of the current driver does not match with any pre-stored records in the first database.

Step 4012c: digitally processing the identification information of the current driver to thereby obtain a second electrical signal if the identification information of the current driver matches with any one of the records of identification information of n drivers;

Herein if the identification information of the current driver is A in the example as mentioned above, the acquisition device can digitally process the identification information of the current driver to obtain a second electrical signal, which then allows the acquisition device to combine with the first electrical signal comprising the identification information of the target vehicle to generate a first identification electrical signal. The second electrical signal can be a digital electrical signal.

In order to avoid unauthorized use of a vehicle, in some embodiments, the vehicle identification method can prohibit the target vehicle from being started if the identification information of the current driver fails to match with any one of the records of identification information of n drivers.

In some other embodiments of the present disclosure, the vehicle identification method allows recording the identification information of the current driver if the identification information of the current driver fails to match with any one of the records of identification information of n drivers.

Figure 4E:
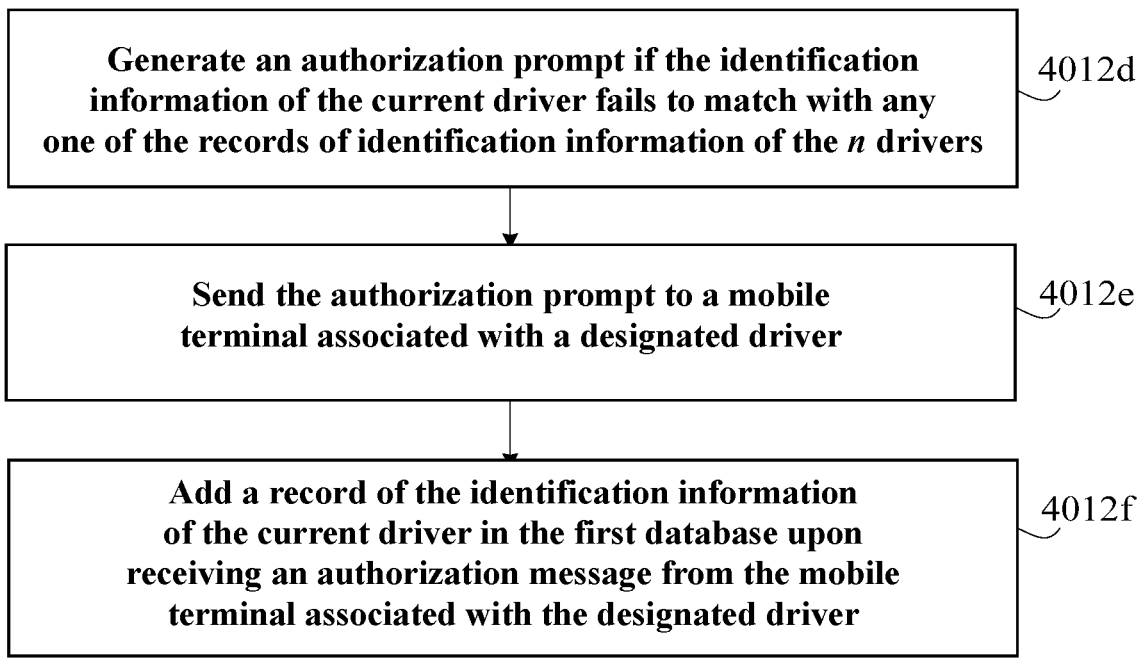
FIG. 4E is a flow chart of recording identification information of a current driver in the vehicle identification method according to some embodiment of the present disclosure.

Specifically, the step of recording the identification information of the current driver is illustrated in FIG. 4E and can comprise the following steps:

Step 4012*d*: generating an authorization prompt if the identification information of the current driver fails to match with any one of the records of identification information of n drivers;

Herein the authorization prompt is configured to prompt the designated driver whether or not the current driver shall be authorized, wherein the designated driver is one of the n drivers whose identification information is pre-stored as one record in the first database.

For example, if the record of the identification information of the current driver in Step 4012*b* is C, the acquisition device can thus determine that the identification information of the current driver does not match with any pre-stored records in the first database, and at the moment, the acquisition device can generate an authorization prompt.

Step 4012*e*: sending the authorization prompt to a mobile terminal associated with a designated driver;

Herein after generating the authorization prompt, the acquisition device sends the authorization prompt to a mobile terminal used by the designated driver, such that the designated driver can decide whether or not to authorize the current driver.

Figure 4F:
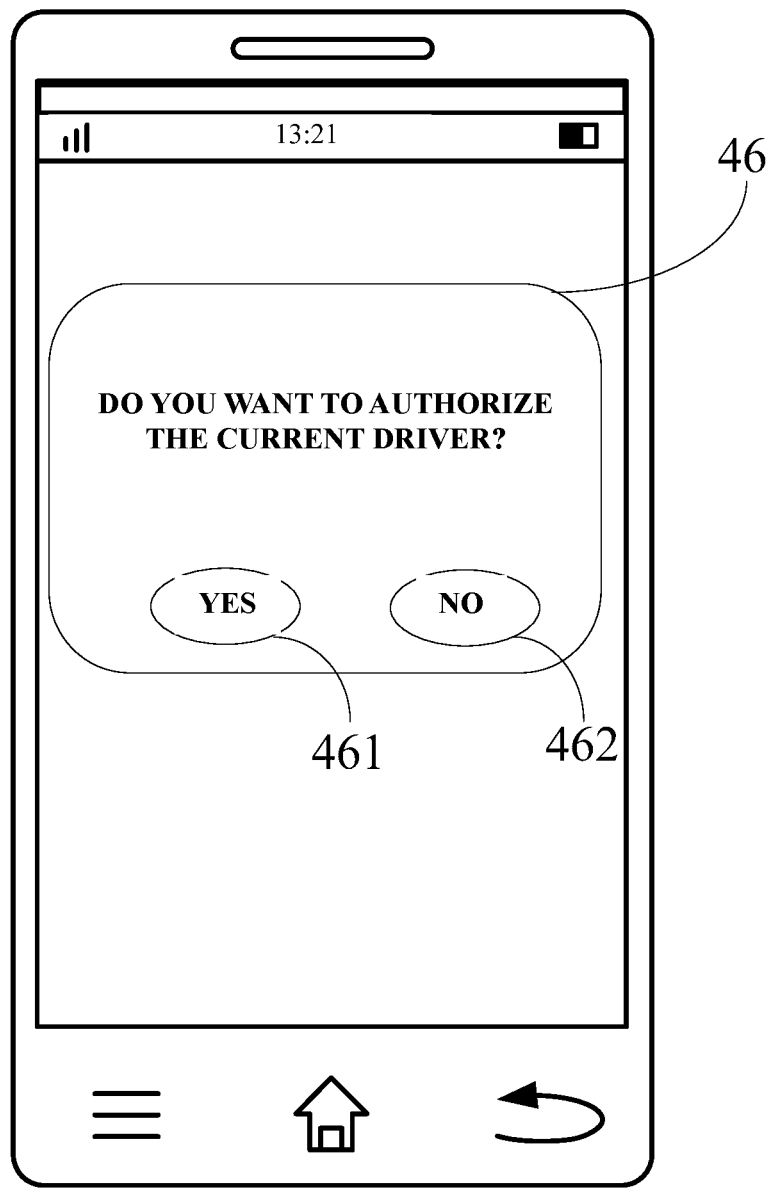
FIG. 4F illustrates a prompt interface in the vehicle identification method according to some embodiment of the present disclosure.

The mobile terminal can be a smart phone, on which an application configured for management of vehicles can be installed. Through the application, the acquisition device can send the authorization prompt to the mobile terminal associated with the designated driver. In one example as illustrated in FIG. 4F, the application can display a prompt interface 46 on the mobile terminal. On the prompt interface 46, a message such as "DO YOU WANT TO AUTHORIZE THE CURRENT DRIVER?" can be displayed, and then the designated driver can pick "YES" (shown as 461) for authorizing the current driver, or can pick "NO" (shown as 462) for not authorizing the current driver.

Step 4012*f*: adding a record of the identification information of the current driver in the first database upon receiving an authorization message from the mobile terminal associated with the designated driver.

Herein the authorization message is generated by the mobile terminal associated with the designated driver upon receiving an authorization instruction from the designated driver, and is configured to add a record of the identification information of the current driver in the first database.

The designated driver can determine whether or not to authorize the current driver after his/her mobile terminal receives the authorization prompt. The designated driver can trigger an authorization instruction through the prompt interface on the mobile terminal as illustrated in FIG. 4F. Upon receiving the authorization instruction, the mobile terminal sends an authorization message to the acquisition device, and the acquisition device then adds a record of the identification information of the current driver in the first database.

For example, the records of the identification information of two drivers pre-stored in the first database are A and B, and upon receiving the authorization message from the mobile terminal, the acquisition device can add a record (C) of the identification information of the current driver in the first database.

It should be noted that if the identification information of the current driver fails to match with any one of the records of identification information of n drivers, it is possible that the vehicle is under unauthorized use or under an authorized use. If the vehicle is under unauthorized use, Steps 4012*d*-4012*f* allow the designated driver (or the owner) to authorize the current driver, such that the identification information of the current driver is added in the first database, but the acquisition device does not add the identification information of the vehicle corresponding to the identification information of the current driver in a second database, which is configured to store records of original identification information of vehicles.

As such, whenever a vehicle passes by a recognition device, the recognition device can determine the identification information of the vehicle based on the optical signals transmitted by the vehicle, and can send the recognition results, which can include location information and identification information of the first user, to the mobile terminal associated with the second user. If the recognition device is unable to determine the identification information of the vehicle based on the optical signal transmitted from the vehicle, the vehicle can be stopped at any of the checkpoints, which thus allows the owner to timely obtain the information regarding the location and the moving track of the vehicle, to fetch the vehicle that has been under an unauthorized use, and to determine the identification information of the current driver, who in this case is an unauthorized user.

In some embodiments, the "NO" option (shown as 462 in FIG. 4F) can be masked by the application running on the mobile terminal. As such, if the mobile terminal of the designated driver (often an owner) receives an authorization prompt transmitted from the acquisition device, the application does not need to display the prompt interface to the designated driver, but rather directly sends an authorization message to the acquisition device, which allows the acquisition device to add the identification information of the current driver in the first database.

If the vehicle is not under unauthorized use (for example, the vehicle is being driven by a friend of the designated driver), in order to allow a smooth pass-by or pass-through of the vehicle after the designated driver authorizes the current driver, the identification information of the vehicle corresponding to the identification information of the current driver can be added to the second database. As such, the recognition device can determine the identification information of the vehicle based on the optical signals transmitted by the vehicle.

Herein the second database can be arranged or configured inside a recognition device, or in a remote cloud. The first database and the second database can be combined in a single database, which can be configured in a remote cloud for updates and maintenance.

Specifically, the acquisition device can send to the recognition device an adding instruction, configured to instruct the recognition device to add the identification information of the target vehicle corresponding to the identification information of the current driver in the second database. Upon receiving the adding instruction, the recognition device adds the identification information of the target vehicle corresponding to the identification information of the current driver in the second database.

Step 4013: generating a first identification electrical signal comprising the identification information of the target vehicle based on the first electrical signal and the second electrical signal.

In Step 4013, the acquisition device generates (or synthesizes) the first identification electrical signal comprising the identification information of the target vehicle based on the first electrical signal that has been obtained from Step 4011 and the second electrical signal that has been obtained from Step 4012, and then sends the first optical signal comprising the identification information of the target vehicle to the recognition device. Upon receiving the first optical signal, the recognition device can determine the identification information of the target vehicle, based on which the recognition device can further perform a certain action, such as allowing or prohibiting the target vehicle to pass by.

Herein the identification information of the target vehicle can comprise code information of the target vehicle, such as a license plate number or a vehicle identification number (VIN) of the target vehicle, or can be compound information comprising a combination of code information of the target vehicle (license plate number or VIN) and identification information of the current driver.

If the identification information of the vehicle comprises code information of the target vehicle (license plate number or VIN), the acquisition device can directly send the first optical signal comprising the code information of the target vehicle to the recognition device for determining the identification information of the vehicle.

If the identification information of the target vehicle is compound information comprising a combination of code information of the target vehicle (license plate number or VIN) and identification information of the current driver, the acquisition device can send the first optical signal comprising the compound information to the recognition device. By combining the code information of the vehicle (license plate number or VIN) and the identification information of the current driver to determine the identification information of the target vehicle, it is beneficial to improve an accuracy of the identification information of the target vehicle, which can in turn prevent an unauthorized user from driving the target vehicle.

Figure 4G:
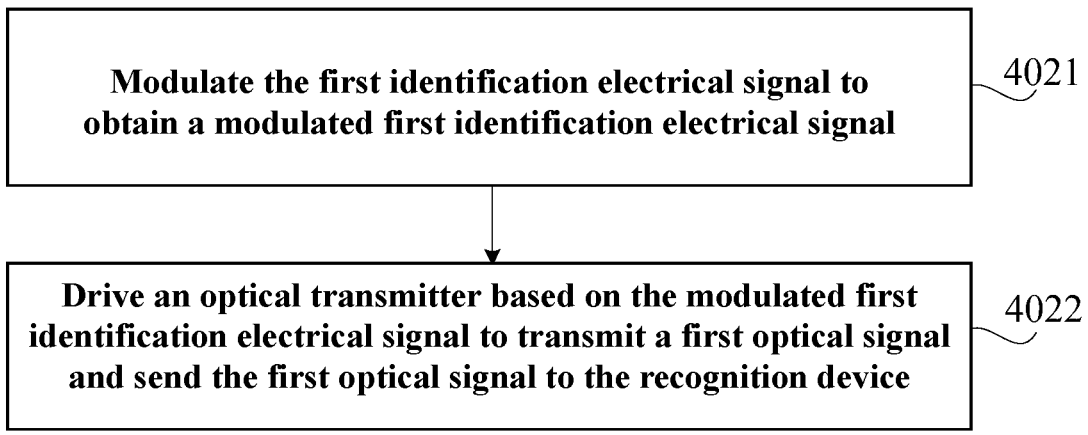
FIG. 4G is a flow chart of transmitting a first optical signal to a recognition device in a vehicle identification method according to some embodiment of the present disclosure.

As illustrates in FIG. 4G Step 402 of the vehicle identification method can comprise the following steps:

Step 4021: modulating the first identification electrical signal to obtain a modulated first identification electrical signal;

Herein in order to allow the vehicle to transmit an optical signal, the acquisition device needs to modulate the first identification electrical signal such that an optical transmitter (for example, a vehicle lamp) can be driven to transmit optical signals based on the modulated first identification electrical signal.

Step 4022: driving an optical transmitter based on the modulated first identification electrical signal to transmit a first optical signal and sending the first optical signal to the recognition device.

Through the modulation by the acquisition device, the optical transmitter, such as a vehicle lamp, can be driven to emit light based on the modulated first identification electrical signal. As such, the optical transmitter can transmit a first optical signal having a relatively long transmission distance, a relatively strong direction, a weak penetrance, and a fast light-darkness alternation. In one illustrating example, a first optical signal transmitted from a vehicle lamp of a target vehicle comprises a plurality of light/darkness statuses: light, darkness, light, light, darkness, light, light, darkness, light, and darkness.

In cases where the target vehicle is at a toll station in a toll road, typically identification information needs to be collected individually for each of a plurality of vehicles running on the toll road, and as a result, the time period required for vehicle identification is commonly long and vehicles commonly run slowly at around the toll station.

Figure 4H:
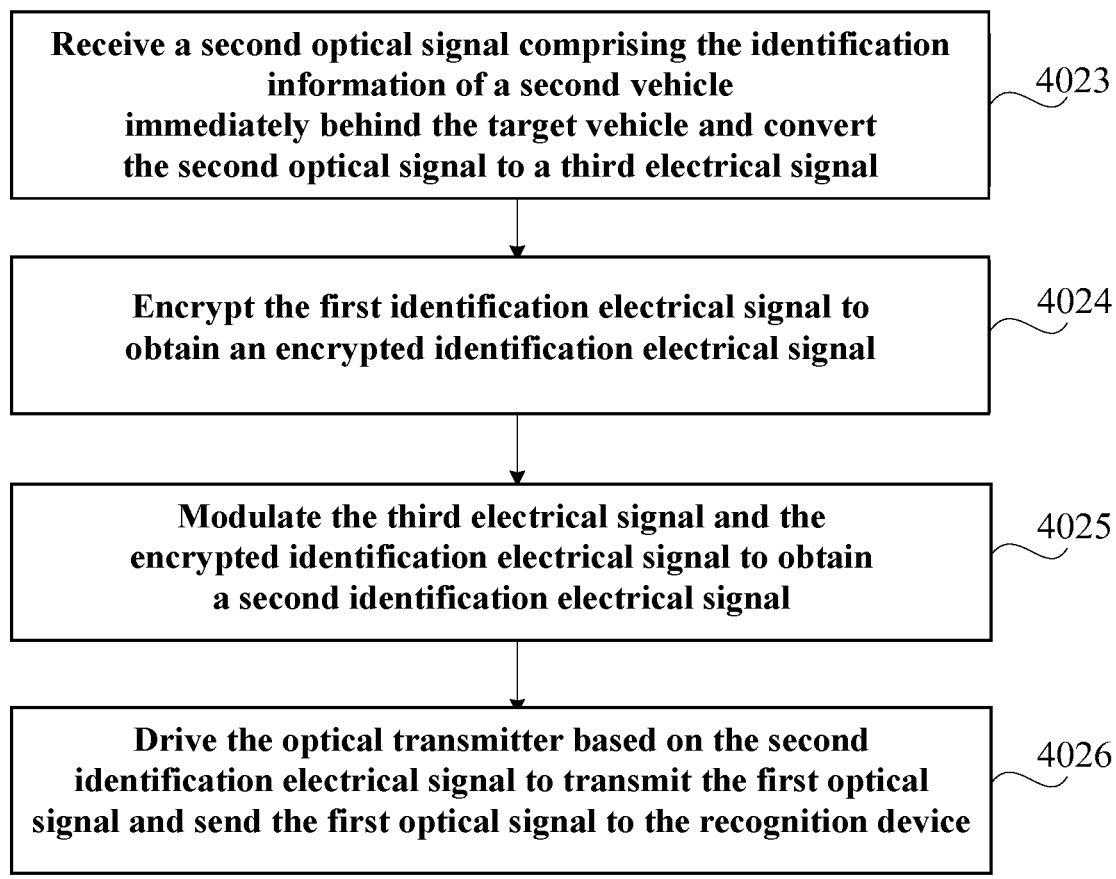
FIG. 4H is a flow chart of transmitting a first optical signal to a recognition device in a vehicle identification method according to another embodiment of the present disclosure.

In order to address the above issue, in some embodiments of the vehicle identification method (illustrated in FIG. 4H), Step 402 can comprise the following steps:

Step 4023: receiving a second optical signal comprising the identification information of a second vehicle and converting the second optical signal to a third electrical signal, wherein the second vehicle is immediately behind the target vehicle;

Herein the second optical signal is transmitted from the second vehicle immediately behind the target vehicle (also can be called the first vehicle), and is generated by encrypting and modulating the electrical signal comprising the identification information of the second vehicle and by further driving the optical transmitter based on the modulated electrical signal. The second vehicle is next to, and immediately behind, the target vehicle. The third electrical signal can be a digital electrical signal. The process whereby the second optical signal transmitted from the second vehicle is generated can reference to Step 401, Steps 4011-4013, and Steps 4021-4022, and the details are skipped herein.

Figure 4I:
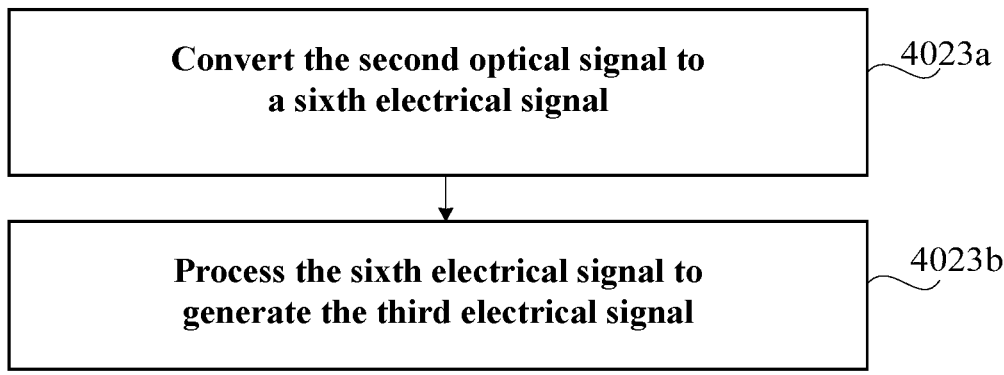
FIG. 4I is a flow chart of converting a second optical signal to a third electrical signal in a vehicle identification method according to some embodiment of the present disclosure.

In some embodiments of the vehicle identification method, as shown in FIG. 4I, the converting the second optical signal to a third electrical signal can comprise:

Step 4023*a*: converting the second optical signal to a sixth electrical signal;

Herein upon receiving the second optical signal from the second vehicle, the acquisition device of the target vehicle converts the second optical signal to the sixth electrical signal.

Step 4023*b*: processing the sixth electrical signal to generate the third electrical signal.

Herein processing of the sixth electrical signal can comprise pre-processing and a digital processing. Specifically, during pre-processing, the acquisition device of the first vehicle sequentially processes the sixth electrical signal through filter processing, noise reduction processing, gain processing, and shaping processing, to thereby obtain a processed sixth electrical signal. Next during digital processing, the acquisition device processes the processed sixth electrical signal to further obtain the third electrical signal. The technical details of the pre-processing can reference to current technologies and are skipped herein.

Step 4024: encrypting the first identification electrical signal to obtain an encrypted identification electrical signal;

Herein the first identification electrical signal comprising the identification information of the target vehicle is encrypted so as to improve the security of the identification information of the target vehicle. After encryption, an encrypted identification electrical signal is thus obtained. Similarly, for the second vehicle (i.e. the vehicle immediately behind the target vehicle), as well as the vehicles that are consecutively behind one another, the identification information of each of these vehicles can also be encrypted by the acquisition device disposed on the each of these vehicles before transmitting to the vehicle immediately in front thereof.

Step 4025: modulating the third electrical signal and the encrypted identification electrical signal to obtain a second identification electrical signal;

Herein the third electrical signal that has been obtained in Step 4023 and the encrypted identification electrical signal that has been obtained in Step 4024 can be modulated to generate the second identification electrical signal.

Step 4026: driving the optical transmitter based on the second identification electrical signal to transmit the first optical signal and sending the first optical signal to the recognition device.

It is noted that the embodiment of the vehicle identification method as described above is based on an illustrating example where the identification information of a second vehicle that is immediately behind the target vehicle (or the first vehicle) is transmitted to the target vehicle. In real situation, the identification information of a third vehicle that is immediately behind the second vehicle can also be transmitted to the target vehicle via the second vehicle, and the target vehicle can thus send the identification information of the second vehicle and the third vehicle to the recognition device.

By extrapolating, the target vehicle can collect, and send to the recognition device, the identification information of the plurality of vehicles that are behind the target vehicle. As such, the recognition device can simultaneously determine the identification information of the target vehicle and of each of the plurality of vehicles therebehind, leading to a shortened identification time period and an improved passing speed of the vehicles.

Step 403: the recognition device determines the identification information of the target vehicle based on the first optical signal.

Figure 4J:
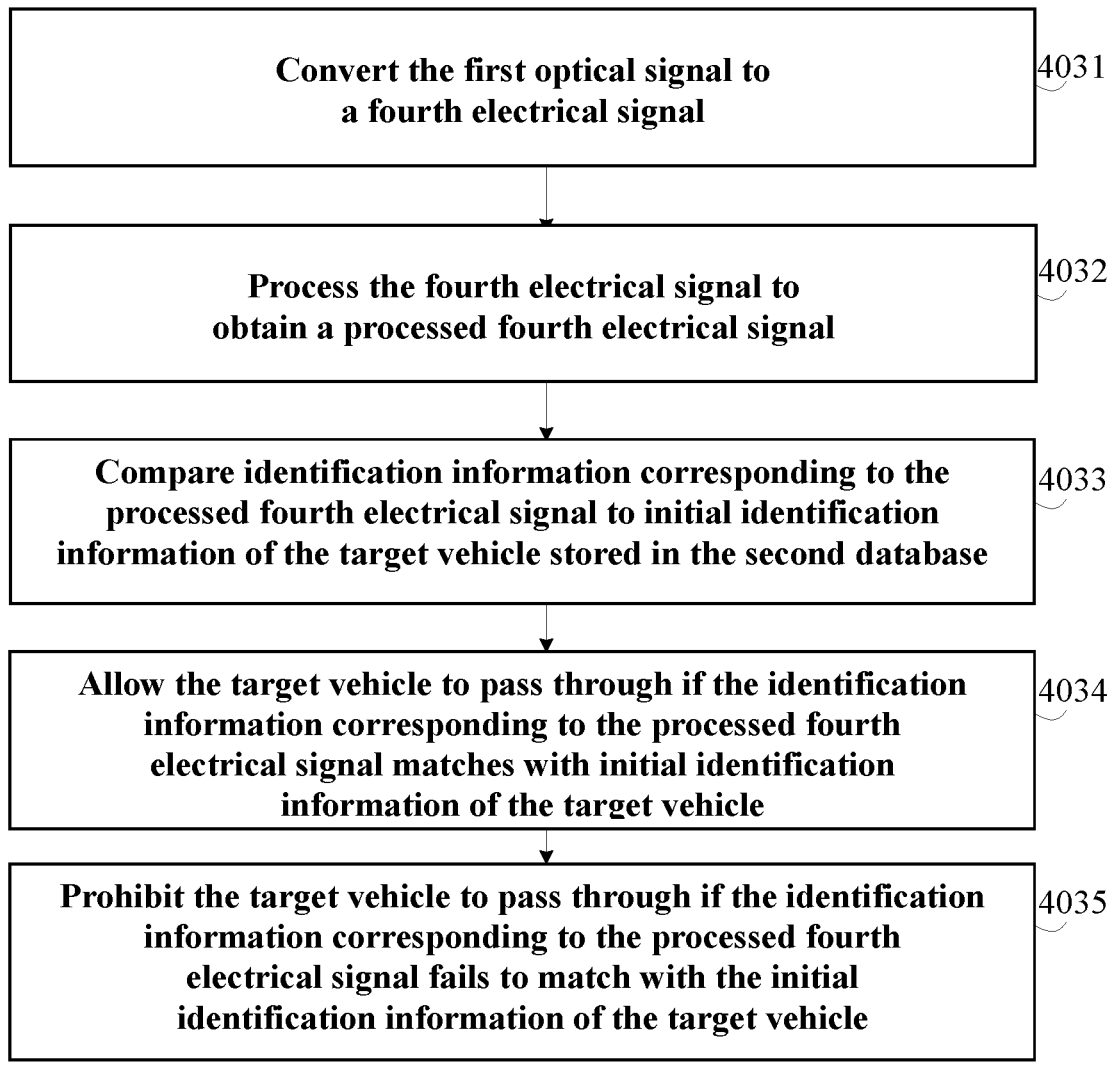
FIG. 4J is a flow chart of recognizing identification information of the target vehicle applying a vehicle identification method according to some embodiment of the present disclosure.

In cases where a target vehicle is passing through a garage door or a gated entrance, as illustrated in FIG. 4J, in some embodiments of the vehicle identification method, for example, in situations such as a target vehicle entering a garage, Step 403 can comprise:

Step 4031: converting the first optical signal to a fourth electrical signal;

Herein if the first optical signal comprises only the identification information of the target vehicle, upon receiving the first optical signal transmitted by the acquisition device on the target vehicle, the recognition device can convert the first optical signal to the fourth electrical signal. The fourth electrical signal can be a digital electrical signal.

Figure 4K:
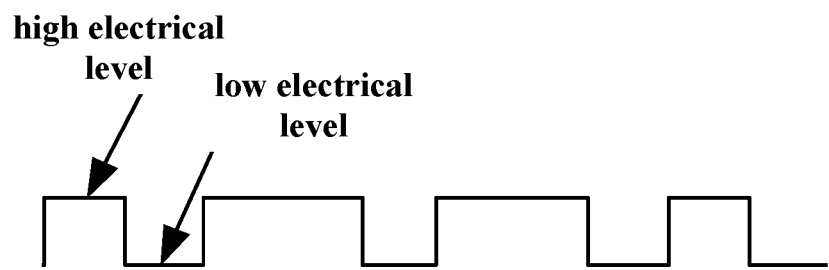
FIG. 4K is an illustration of a fourth electrical signal involved in a vehicle identification method according to some embodiment of the present disclosure.

Assuming the first optical signal transmitted from the optical transmitter, such as a lamp, of the target vehicle comprises a plurality of light/darkness statuses: light, darkness, light, light, darkness, light, light, darkness, light, and darkness, and upon receiving the first optical signal, the recognition device can convert the first optical signal comprising the plurality of light/darkness statuses to a fourth electrical signal comprising a combination of high electrical levels and low electrical levels, wherein each of the high electrical levels and each of the low electrical levels corresponds to a light status and a darkness status respectively. The fourth electrical signal is illustrated in FIG. 4K.

Step 4032: processing the fourth electrical signal to obtain a processed fourth electrical signal;

Herein the fourth electrical signal can be consecutively processed by filter processing, noise reduction processing, gain processing, and shaping processing, to thereby obtain a processed fourth electrical signal.

Step 4033: comparing identification information corresponding to the processed fourth electrical signal to initial identification information of the target vehicle pre-stored in the second database;

In this step, if the initial identification information of the target vehicle pre-stored in the second database is L, and the identification information corresponding to the processed fourth electrical signal is also L, then the recognition device can determine that the identification information corresponding to the processed fourth electrical signal matches with the initial identification information of the target vehicle pre-stored in the second database.

If the identification information corresponding to the processed fourth electrical signal is M, the recognition device can determine that the identification information corresponding to the processed fourth electrical signal does not match with the initial identification information of the target vehicle pre-stored in the second database.

Step 4034: allowing the target vehicle to pass through if the identification information corresponding to the processed fourth electrical signal matches with the initial identification information of the target vehicle;

In the example as mentioned above, if the identification information corresponding to the processed fourth electrical signal is L, then the recognition device can allow the target vehicle to pass by or pass through.

Step 4035: prohibiting the target vehicle to pass through if the identification information corresponding to the processed fourth electrical signal fails to match with the initial identification information of the target vehicle.

In the example as mentioned above, if the identification information corresponding to the processed fourth electrical signal is M, then the recognition device can prohibit the target vehicle from passing by or through.

Figure 4L:
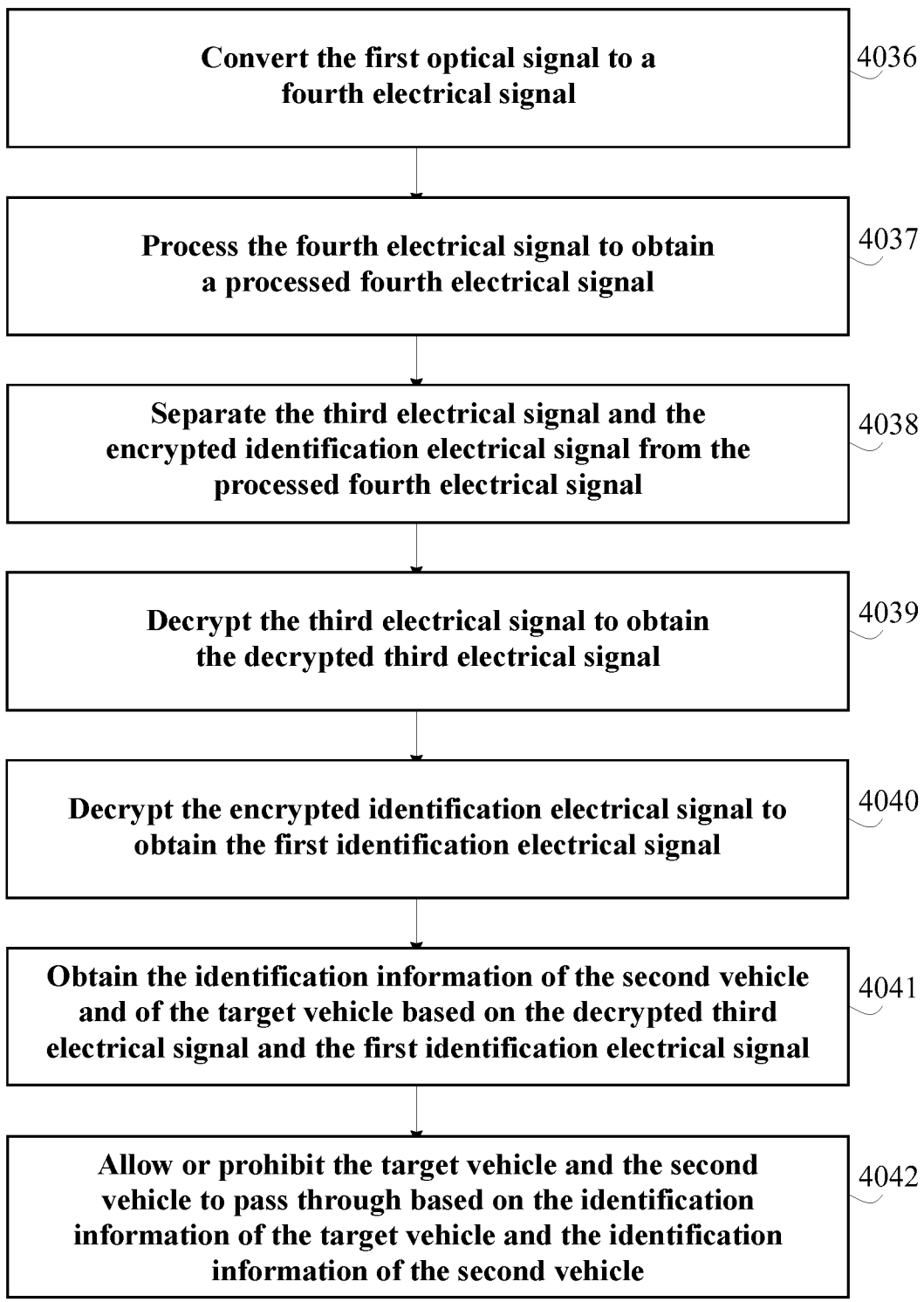
FIG. 4L is a flow chart of recognizing identification information of the target vehicle applying a vehicle identification method according to another embodiment of the present disclosure.

In cases where the target vehicle is at a toll station in a toll road, as illustrated in FIG. 4L, Step 403 can comprise the following steps:

Step 4036: converting the first optical signal to a fourth electrical signal;

Herein if the first optical signal comprises the identification information of the second vehicle immediately behind the first vehicle, Step 4031 can be employed, i.e. upon receiving the first optical signal, the recognition device can convert the first optical signal to the fourth electrical signal.

Step 4037: processing the fourth electrical signal to obtain a processed fourth electrical signal;

Herein the fourth electrical signal can be consecutively processed by the recognition device via filter processing, noise reduction processing, gain processing, and shaping processing, to thereby obtain a processed fourth electrical signal.

Step 4038: separating the third electrical signal and the encrypted identification electrical signal from the processed fourth electrical signal;

Herein in order to recognize the identification information of the target vehicle and the identification information of the second vehicle, the recognition device can separate the third electrical signal and the encrypted identification electrical signal from the processed fourth electrical signal.

Step 4039: decrypting the third electrical signal to obtain the decrypted third electrical signal;

Herein the second optical signal is obtained by encrypting and modulating the electrical signal comprising the identification information of the second vehicle and by driving the optical transmitter based on the modulated electrical signal, thus the third electrical signal needs to be decrypted by the recognition device.

Step 4040: decrypting the encrypted identification electrical signal to obtain the first identification electrical signal;

Herein because the acquisition device of the target vehicle encrypts the first identification electrical signal to obtain the encrypted identification electrical signal, correspondingly the recognition device needs to decrypt the encrypted identification electrical signal.

Step 4041: obtaining the identification information of the second vehicle and the identification of the target vehicle based on the decrypted third electrical signal and the first identification electrical signal;

Herein the detailed process whereby the identification information of the second vehicle and the identification of the target vehicle is obtained can reference to Steps 4031-4035.

Step 4042: allowing or prohibiting the target vehicle and the second vehicle to pass through based on the identification information of the target vehicle and the identification information of the second vehicle respectively.

Herein the detailed process can reference to Steps 4034-4035.

It is noted that the first optical signal can further include the identification information of at least one third vehicle behind the second vehicle. As such, the recognition device can simultaneously obtain the identification information of the target vehicle (or the first vehicle), the second vehicle, and each of the at least one third vehicle. Based on the identification information of the target vehicle, the second vehicle, and each of the at least one third vehicle respectively, the recognition device can allow/prohibit the pass-through of the target vehicle, the second vehicle, and each of the at least one third vehicle, thus leading to a shortened identification time period and an improved passing speed of the vehicles.

It is further noted for the electronic toll collection (ETC) system commonly employed at toll stations in current technologies. The working principle of a conventional ETC system is as follows:

An electronic tag mounted on a windshield of a vehicle communicates with a microwave antenna disposed on an ETC Lane through a short-range communication channel. By means of a toll computing system and a computer networking technology that connects with a backstage settlement system in a bank, tolls can be collected at the toll stations without stopping.

Despite the general convenience, because of the presence of electromagnetic radiation, it is needed to identify and charge each vehicle individually, and the recognition distance is also relatively short. In addition, an ETC system and a man-assisted toll collection system are typically independently run in parallel, and currently the simultaneous management of the two systems is complicated, the cost of management is larger.

In contrast, the vehicle identification method as described above utilizes optical signals transmitted from the optical transmitter without electromagnetic radiation. A transmission distance of an optical signal is typically 100 m-200 m.

Additionally by means of the optical signals, the identification information of each vehicle can be independently obtained, and the identification information of a plurality of vehicle in a consecutive row can be simultaneously obtained, together leading to an increased identification speed, an elevated passing speed of vehicles, a shortened identification time period, and a reduced waiting time. Thereby the issues as noted above that are associated with current technologies including an ETC system and/or a man-assisted toll collection system can be effectively solved.

Figure 4M:
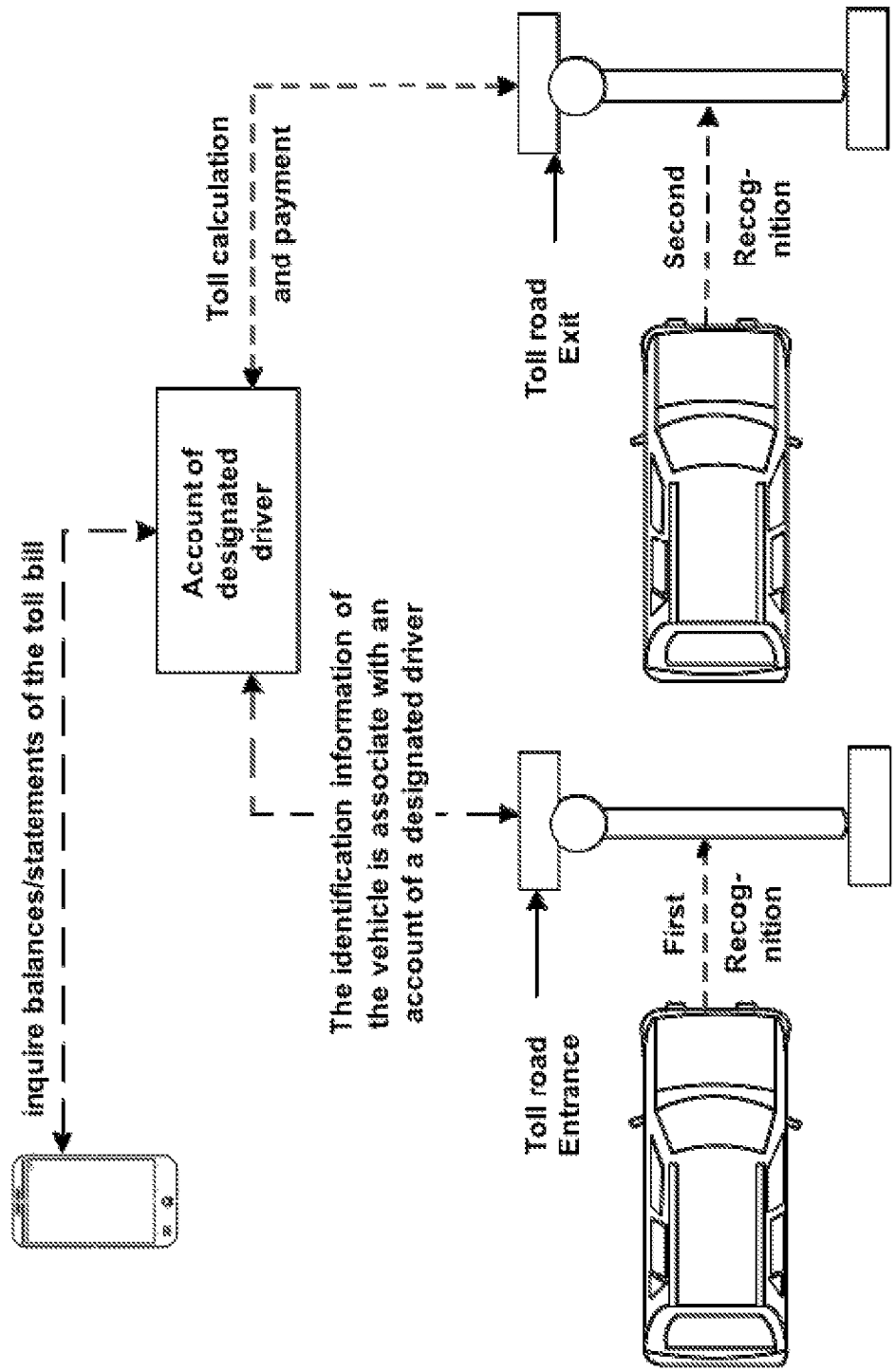
FIG. 4M is a flow chart illustrating a toll calculation and collection process applying a vehicle identification method according to some embodiment of the present disclosure.

FIG. 4M illustrates a toll calculation and collection process employing a vehicle identification method according to some embodiments of the present disclosure. As shown in FIG. 4M, when a vehicle approaches an entrance of a toll road, a first recognition device disposed at a first toll station around the entrance can recognize or obtain the identification information of the vehicle (i.e. first recognition).

If the driver is an unauthorized user of the vehicle, the recognition device fails to recognize the vehicle, and the vehicle is stopped. If the driver is not an unauthorized user of the vehicle, the recognition device can successfully recognize the vehicle. Then a toll calculation system can associate the identification information of the vehicle with an account of a designated driver. When the vehicle moves to an exit of the toll road, a second recognition device disposed at a second toll station around the exit can again obtain the identification information of the vehicle (i.e. second recognition), and the toll calculation system can then carry out backstage settlement with a bank via the internet networking technology, whereby a toll can be automatically deducted from the account of the designated driver (i.e. toll calculation and payment).

In addition, the designated driver can also inquire the balance and statement of the bill of tolls generated by the toll calculation system, make a payment, and/or make a transfer. In the process, because the optical signal transmitted by the optical transmitter (for example, a vehicle lamp) can transmit to a distance of 100 m-200 m, when vehicles are approaching the toll stations, they do not need to slow down, thus leading to an increased speed and flow of passing vehicles. The technical details regarding the process whereby the toll calculation system manipulates the payment and settlement can reference to current technologies, and will not be repeated herein.

It is noted that the various steps in the vehicle identification method as described above can be adjusted, added, or deleted depending on specific needs. Any such modifications made by people of ordinary skills in the art shall be within the scope of this disclosure.

Taken together, the vehicle identification method as described above can utilize optical signals comprising the identification information of vehicles for the recognition of the identification information of the vehicles. Because optical signals typically have a relatively long transmission distance and a relatively strong direction, compared with current technologies, the vehicle identification method as described above is thus capable of determining the identification information of a vehicle even when there is a long distance between the vehicle and the recognition device. Thus the time periods required for recognizing multiple vehicles can be shortened, resulting in an increased speed for the multiple vehicles. As such, the vehicle identification method has an improved capability and practicability.

Figure 5A:
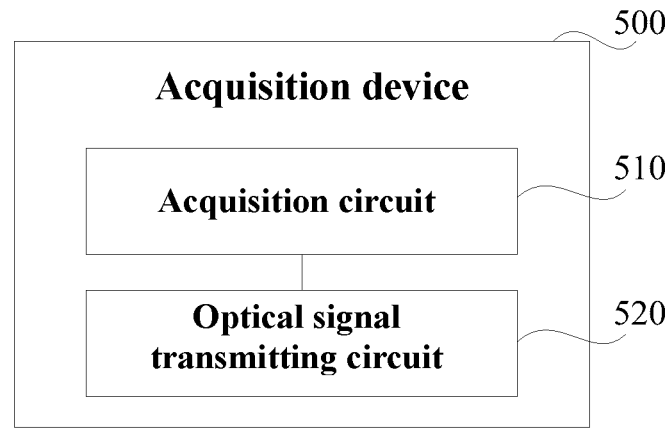
FIG. 5A is a schematic diagram of an acquisition device according to some embodiments of the present disclosure.

In another aspect, the present disclosure provides an acquisition device, which can be disposed on a target vehicle. As shown in FIG. 5A, the acquisition device 500 comprises an acquisition circuit 510 and an optical signal transmitting circuit 520.

The acquisition circuit 510 is configured to obtain, or acquire, identification information of a target vehicle. The optical signal transmitting circuit 520 is configured to transmit a first optical signal comprising the identification information of the target vehicle to a recognition device such that the recognition device can recognize the identification information of the target vehicle based on the first optical signal.

Figure 5B:
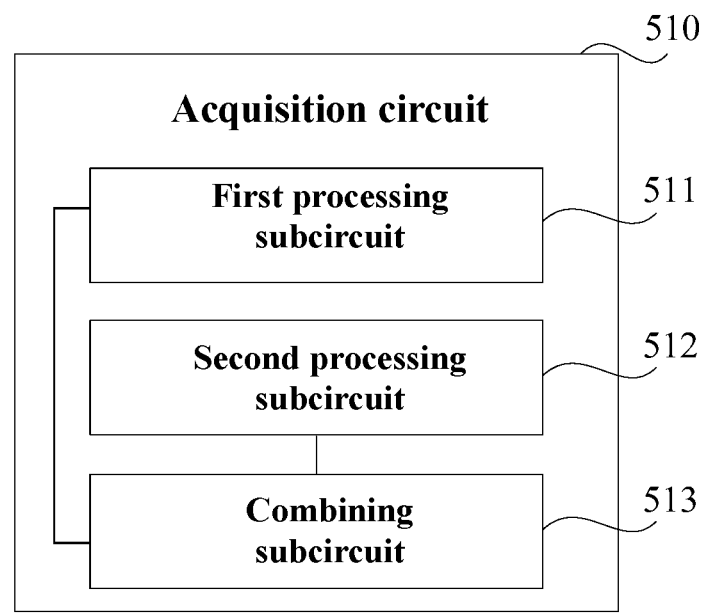
FIG. 5B is a schematic diagram of an acquisition circuit according to some other embodiments of the present disclosure.

Optionally according to some embodiments of the present disclosure as illustrated in FIG. 5B, the acquisition circuit 510 can comprise a first processing subcircuit 511, a second processing subcircuit 512, and a combining subcircuit 513.

The first processing subcircuit 511 is configured to obtain the code information of the target vehicle, to convert the code information of the target vehicle to a read-only first electrical signal, and to send the first electrical signal to the combining subcircuit 513.

The second processing subcircuit 512 is configured to obtain the identification information of a current driver, to convert the identification information of the current driver to a second electrical signal, and to send the second electrical signal to the combining subcircuit 513.

The combining subcircuit 513 is configured to generate a first identification electrical signal comprising the identification information of the target vehicle based on the first electrical signal and the second electrical signal.

It should be noted that according to some other embodiments, the function of the first processing subcircuit 511 and the function of the second processing subcircuit 512 can be combinatorially performed by only one single processing subcircuit (not shown), i.e., the single one processing subcircuit of the acquisition circuit 510 can be configured to convert the code information of the first vehicle into a first electrical signal, and to convert the identification information of the first driver on the first vehicle into a second electrical signal before a combining subcircuit generates the first identification electrical signal based on the first electrical signal and the second electrical signal.

Figure 5C:
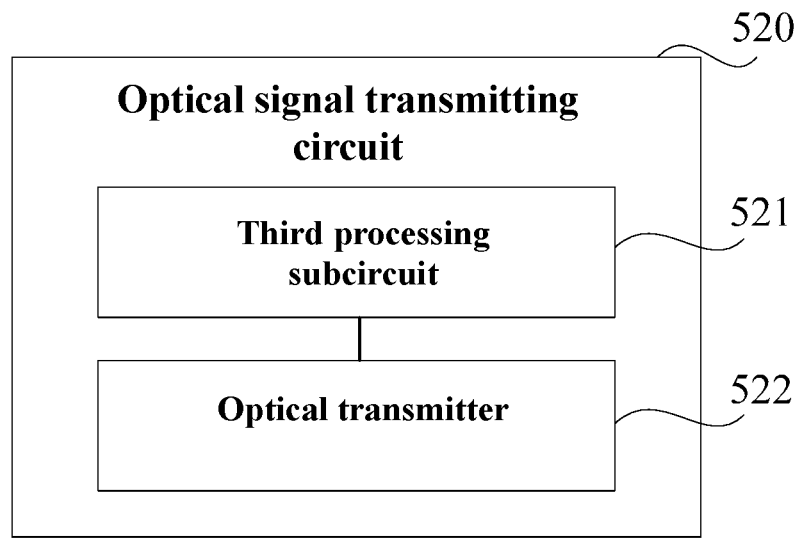
FIG. 5C is a schematic diagram of an optical signal transmitting circuit according to some embodiments of the present disclosure.

It should be further noted that according to some other embodiments of the present disclosure, the acquisition circuit can comprise a processing subcircuit, which is configured to combine the code information of the first vehicle and the identification information of the first driver on the first vehicle to thereby obtain combined identification information of the first vehicle before the first identification electrical signal is generated based on the combined identification information of the first vehicle.

according to some embodiments of the present disclosure, the acquisition circuit 510 can comprise a processing subcircuit Correspondingly as shown in FIG. 5C, the optical signal transmitting circuit 520 can comprise a third processing subcircuit 521 and an optical transmitter 522. The third processing subcircuit 512 is configured to modulate the first identification electrical signal to generate a modulated first identification electrical signal to thereby drive the optical transmitter 522 to transmit the first optical signal to transmit to the recognition device.

Herein the optical signal transmitting circuit 520 can be disposed on a front side of the target vehicle. The optical transmitter 522 in the optical signal transmitting circuit 520 can comprise at least one vehicle lamp, and can also comprise an independent lighting equipment or a light-transmitting device capable of emitting optical signals. The optical transmitter 522 can comprise a light-emitting diode (LED) light. For example, the optical transmitter 522 can comprise a vehicle lamp, which can be a LED light. Because the optical signal transmitted from the LED lights has a relatively long transmission distance, a relatively strong direction, a weak penetrance, and involves no electromagnetic radiation, the LED lights are suitable for transmission and recognition of the identification information of target vehicles.

Figure 5D:
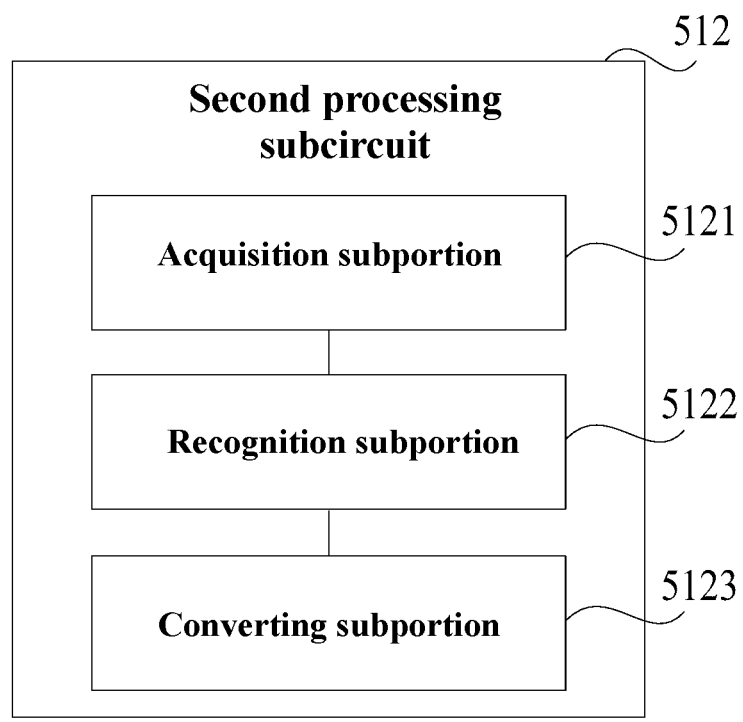
FIG. 5D is a schematic diagram of a second processing subcircuit according to some embodiments of the present disclosure.

In some embodiments of the present disclosure as illustrated in FIG. 5D, the second processing subcircuit 512 can include an acquisition subportion 5121, a recognition subportion 5122, and a converting subportion 5123.

The acquisition subportion 5121 is configured to obtain the identification information of the current driver, and to send the identification information of the current driver to the recognition subportion 5122. The identification information of the current driver can be fingerprint information of the current driver, and accordingly the acquisition subportion 5121 can be a fingerprint acquisition subportion, which can be disposed on a steering wheel of the target vehicle and is configured to obtain the fingerprint information of the current driver.

Figure 5E:
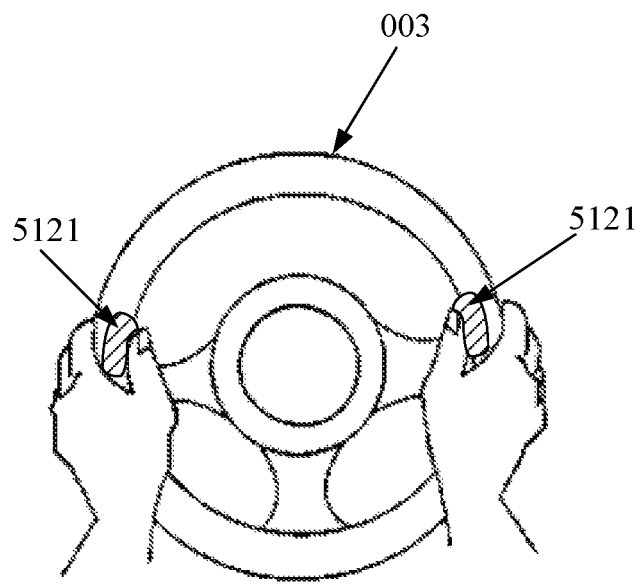
FIG. 5E illustrates an acquisition subportion arranged on a steering wheel of a vehicle according to some embodiments of the present disclosure.

FIG. 5E illustrates one embodiment of the acquisition subportion 5121. The acquisition subportion 5121 comprises two fingerprint acquisition subportions, which are disposed on an upper surface of a steering wheel 003 and correspond respectively to a gripping position for a left hand and a gripping position for a right hand. As such, when the current driver is holding the steering wheel 003 when starting the vehicle, his/her thumbs can be disposed right within the region of the acquisition subportion 5121 on the steering wheel such that the fingerprint information of the current driver can be conveniently obtained. The acquisition subportion 5121 can obtain fingerprint information of at least one thumb to complete obtaining the identification information of the current driver.

The recognition subportion 5122 is configured to query the identification information of the current driver in a first database comprising records of identification information of n drivers, and to send the identification information of the current driver to the converting subportion 5123 if identification information of the current driver matches with any one of the records of identification information of n drivers. Herein the first database can be configured inside the acquisition device, or can be configured in a remote cloud.

The converting subportion 5123 is configured to digitally process the identification information of the current driver to thereby generate a second electrical signal, and to send the second electrical signal to the combining subcircuit.

In some embodiments, the first processing subcircuit 511 can comprise a second acquisition subportion, a second converting subportion, and a solidifying subportion.

The second acquisition subportion is configured to obtain the code information of the target vehicle, and to send the code information of the target vehicle to the second converting subportion.

The second converting subportion is configured to digitally process the code information of the target vehicle to thereby generate a fifth electrical signal, and to send the fifth electrical signal to the solidifying subportion. In some embodiments, the second converting subportion can comprise a digital circuit and as such the second converting subportion can perform a digital processing over the code information of the target vehicle through the digital circuit to generate the fifth electrical signal.

The solidifying subportion is configured to convert the fifth electrical signal to the first electrical signal of a read-only mode, and to send the first electrical signal to the combining subcircuit.

In some embodiments as shown in FIG. 5D, the recognition subportion 5122 is further configured, if the identification of the current driver does not match with any one of the records of identification information of n drivers, to send a control signal to a controller of the target vehicle such that the controller can prohibit the target vehicle from being started upon receiving the control signal. Herein the control signal is configured to prohibit the target vehicle from being started.

Alternatively, in some other embodiments, the recognition subportion 5122 is further configured, if the identification of the current driver does not match with any one of the records of identification information of n drivers, to generate an authorization prompt and send the authorization prompt to a mobile terminal associated with a designated driver. Herein the authorization prompt is configured to request the designated driver whether or not to authorize the current driver, and the designated driver can be any one of the n drivers in the first database.

Related to above, the recognition subportion 5122 is further configured to add a record of the identification information of the current driver in the first database upon receiving an authorization message from the mobile terminal associated with the designated driver. Herein the authorization message is generated on the mobile terminal associated with a designated driver when the designated driver received the authorization prompt, and is configured to instruct the recognition subportion to add the record of the identification information of the current driver in the first database.

In some embodiments, the recognition subportion 5122 is further configured to send an adding instruction to the recognition device. The adding instruction is configured to instruct the recognition device to add the identification information of the target vehicle corresponding to the identification information of the current driver in a second database. The second database is configured to store initial identification information of the target vehicle, and can be arranged in the recognition device or in a remote cloud. The first database and the second database can be combined as one single database arranged in a remote cloud to thereby facilitate updating and maintenance.

Figure 5F:
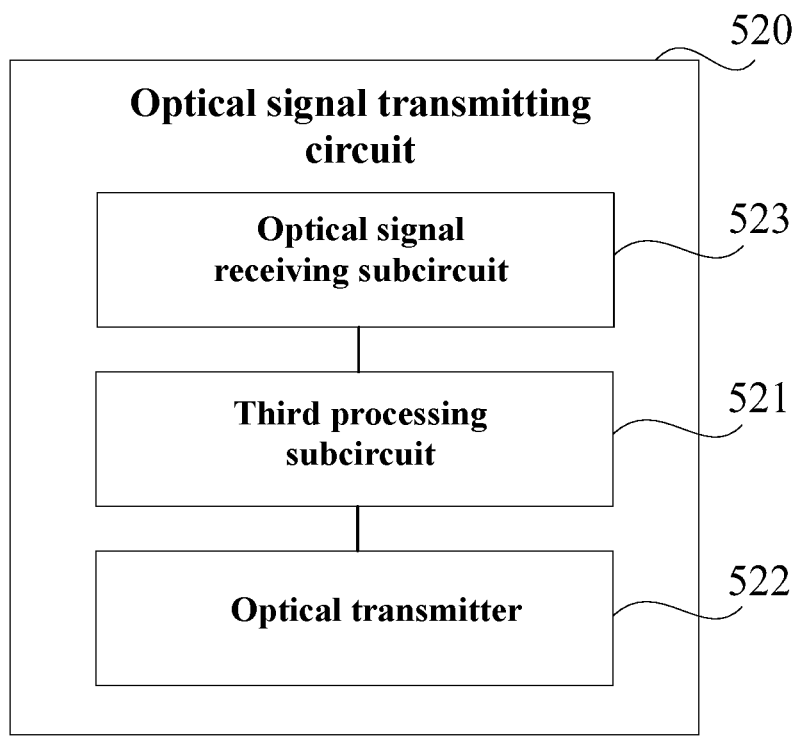
FIG. 5F is a schematic diagram of an optical signal transmitting circuit according to some other embodiments of the present disclosure.

In some embodiments as shown in FIG. 5F, the optical signal transmitting circuit 520 can further include an optical signal receiving subcircuit 523, which can be disposed on a rear side of the target vehicle.

The optical signal receiving subcircuit 523 is configured to receive a second optical signal transmitted from a second vehicle comprising identification information of the second vehicle, and to convert the second optical signal to a third electrical signal, wherein the second vehicle is next to, and behind, the target vehicle. Herein the second optical signal is generated by the second vehicle through encrypting and modulating an electrical signal comprising the identification information of the second vehicle, and further through driving the optical transmitter using the modulated electrical signal.

Correspondingly in some embodiments as shown in FIG. 5B, the combining subcircuit 513 is further configured to encrypt the first identification electrical signal to generate an encrypted identification electrical signal.

In some embodiments as shown in FIG. 5F, the third processing subcircuit 521 is further configured to modulate the third electrical signal and the encrypted identification electrical signal to thereby generate a second identification electrical signal. The second identification electrical signal is then utilized to drive the optical transmitter to transmit the first optical signal, which is then transmitted to the recognition device such that the recognition device can determine the identification information of the target vehicle and the second vehicle based on the first optical signal. Other items in FIG. 5F can be referenced to FIG. 5C.

In some embodiments, the optical signal receiving subcircuit 523 can comprise a receiving subportion and two processing subportions Z1 and Z2. The receiving subportion is configured to receive the second optical signal, to convert the second optical signal to a sixth electrical signal, and to send the sixth electrical signal to the processing subportion Z1. The processing subportion Z1 is configured to pre-process the sixth electrical signal, and to send the pre-processed sixth electrical signal to the processing subportion Z2. The processing subportion Z2 is configured to digitally process the pre-processed sixth electrical signal to thereby generate the third electrical signal. Herein the third electrical signal can be a digital electrical signal.

In some embodiments, the code information of the target vehicle can be a license plate number or VIN of the target vehicle. In some embodiments, the code information of the target vehicle can be a license plate number or VIN of the target vehicle.

Figure 5G:
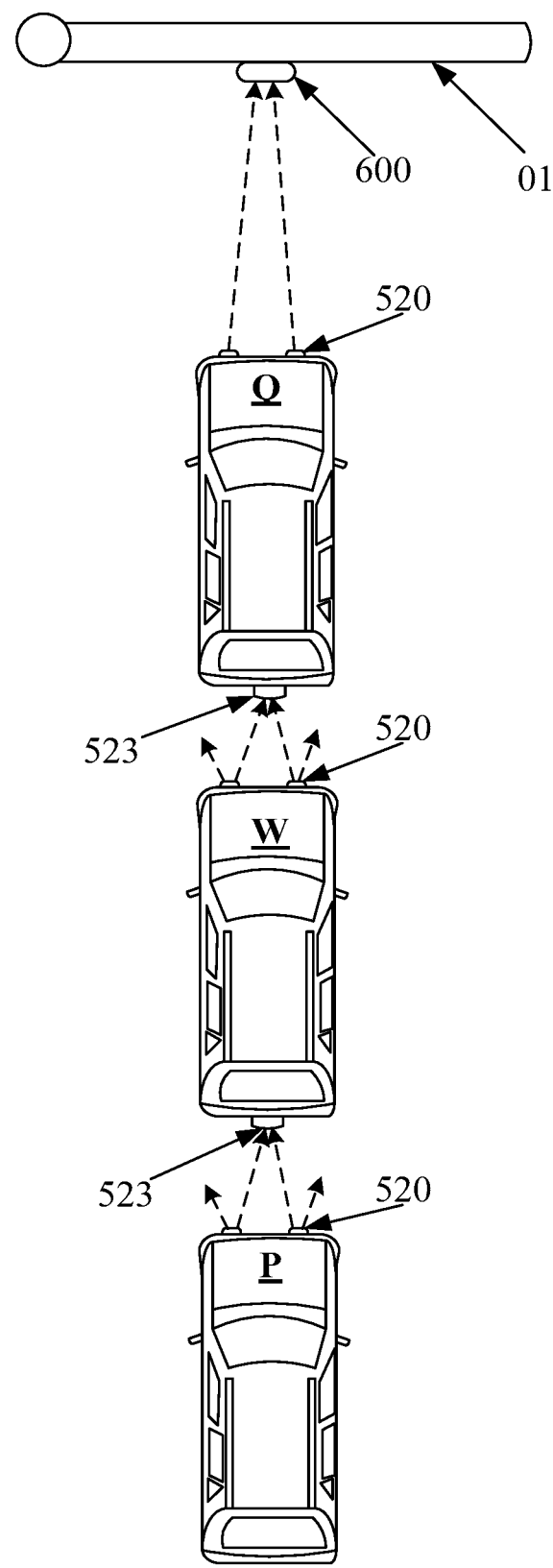
FIG. 5G illustrates an occasion where three consecutive vehicles are moving into a toll station.

FIG. 5G illustrates one occasion where three consecutive vehicles are moving into a toll station. The three consecutive vehicles include vehicle Q, vehicle W, and vehicle P. Vehicle P is provided with an acquisition circuit, which is configured to obtain identification information of vehicle P and to encrypt the identification information of vehicle P. Vehicle P is further provided with an optical signal transmitting circuit 520, which is disposed on a front side of vehicle P and is configured to send an optical signal comprising the identification information of vehicle P to an optical signal receiving subcircuit 523 disposed on a rear side of vehicle W.

The optical signal receiving subcircuit 523 in vehicle W is configured to receive the optical signal comprising the identification information of the vehicle P that is transmitted from vehicle P, and to convert the optical signal to a digital electrical signal. Vehicle W is also provided with an acquisition circuit, which is configured to obtain identification information of vehicle W and to encrypt the identification information of vehicle W. Vehicle W is further provided with an optical signal transmitting circuit 520, which is disposed on a front side of vehicle W and is configured to send an optical signal comprising the identification information of vehicle P and to the identification information of vehicle W to an optical signal receiving subcircuit 523 disposed on a rear side of vehicle Q.

The optical signal receiving subcircuit 523 in vehicle Q is configured to receive the optical signal comprising the identification information of vehicle P and to the identification information of vehicle W that is transmitted from vehicle W, and to convert the optical signal to a digital electrical signal. Vehicle Q is also provided with an acquisition circuit, which is configured to obtain identification information of vehicle Q and to encrypt the identification information of vehicle Q. Vehicle Q is further provided with an optical signal transmitting circuit 520, which is disposed on a front side of vehicle W and is configured to send an optical signal comprising the identification information of vehicle P, to the identification information of vehicle W, and to the identification information of vehicle Q to a recognition device 600 such that the recognition device 600 can determine the identification information of vehicle P, the identification information of vehicle W, and the identification information of vehicle Q.

The acquisition device as described above can send optical signals comprising the identification information of vehicles to the recognition device such that the recognition device can determine the identification information of the vehicles. Because optical signals typically have a relatively long transmission distance and a relatively strong direction, compared with current technologies, the vehicle identification method that employs the acquisition device as described above is thus capable of determining the identification information of a vehicle even when there is a long distance between the vehicle and the recognition device. Thus the time periods required for recognizing multiple vehicles can be shortened, resulting in an increased speed for the multiple vehicles.

Figure 6A:
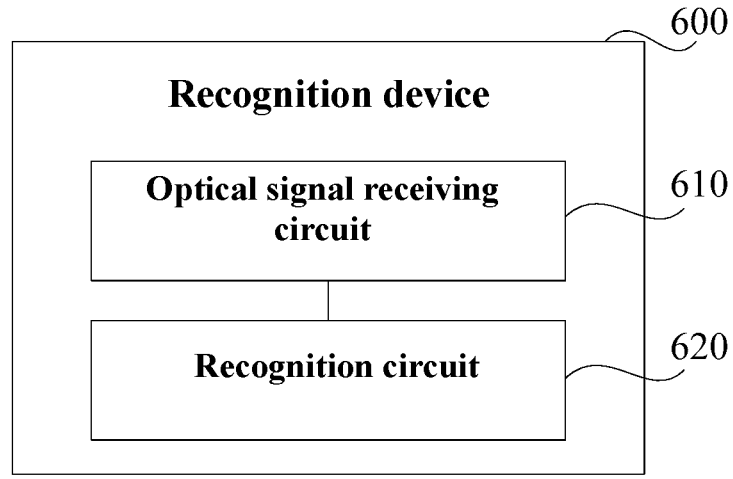
FIG. 6A is a schematic diagram of a recognition device according to some embodiments of the present disclosure.

In another aspect, the present disclosure provides a recognition device, as shown in FIG. 6A. The recognition device 600 comprises an optical signal receiving circuit 610 and a recognition circuit 620.

The optical signal receiving circuit 610 is configured to receive a first optical signal comprising identification information of a target vehicle from an acquisition device mounted on the target vehicle. The recognition circuit 620 is configured to recognize the identification information of the target vehicle based on the first optical signal. The identification information of the target vehicle can be utilized to determine whether to allow or to prohibit the target vehicle to pass through.

The recognition device as described above can recognize the identification information of vehicles based on optical signals comprising the identification information of the vehicles transmitted from acquisition devices mounted on the vehicles. Because optical signals typically have a relatively long transmission distance and a relatively strong direction, compared with current technologies, the vehicle identification method that employs the recognition device as described above is thus capable of determining the identification information of a vehicle even when there is a long distance between the vehicle and the recognition device. Thus the time periods required for recognizing multiple vehicles can be shortened, resulting in an increased speed for the multiple vehicles.

In some embodiments of the present disclosure as illustrated in FIG. 6A, the optical signal receiving circuit 610 is further configured to convert the first optical signal to a fourth electrical signal.

Figure 6B:
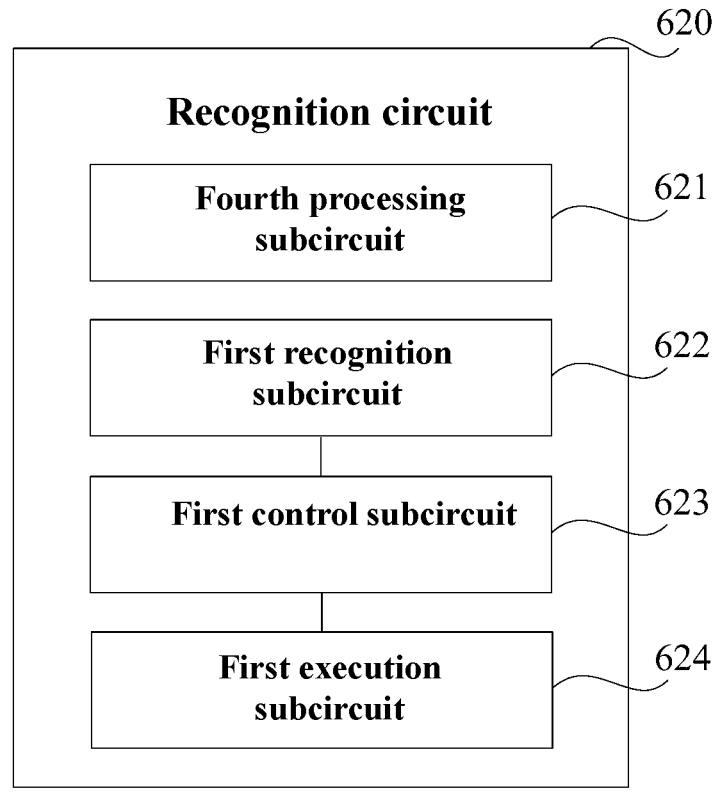
FIG. 6B is a schematic diagram of a recognition circuit according to some embodiments of the present disclosure.

In some embodiments of the present disclosure as illustrated in FIG. 6B, the recognition circuit 620 comprises a fourth processing subcircuit 621, a first recognition subcircuit 622, a first control subcircuit 623, and a first execution subcircuit 624.

The fourth processing subcircuit 621 is configured to pre-process the fourth electrical signal to thereby generate a pre-processed fourth electrical signal, and to send the pre-processed fourth electrical signal to the first recognition subcircuit 622.

The first recognition subcircuit 622 is configured to compare the identification information corresponding to the pre-processed fourth electrical signal with a record of initial identification information of the target vehicle in a second database to thereby generate an instruction, and to send the instruction to the first control subcircuit 623. Herein the instruction is configured to indicate whether or not the identification information corresponding to the pre-processed fourth electrical signal matches with the record of initial identification information of the target vehicle.

The first control subcircuit 623 is configured to control the first execution subcircuit 624 based on the instruction such that the first execution subcircuit 624 can perform certain actions. In one example, the first execution subcircuit 624 can act to allow or to prohibit the target vehicle to pass through.

It is noted that the first control subcircuit 623 and the first execution subcircuit 624 do not need to be in the recognition circuit 620 as illustrated in FIG. 6B, and can be in an independent circuit or two independent circuits other than the recognition circuit 620 according to some embodiments of the present disclosure.

Figure 6C:
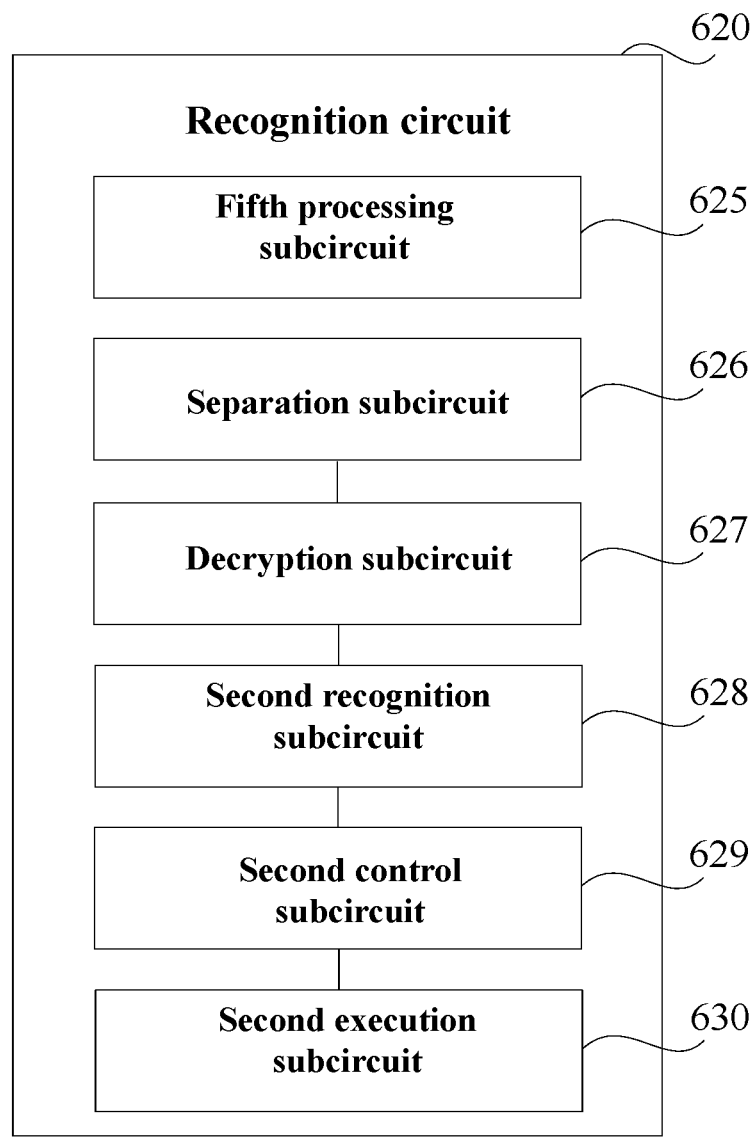
FIG. 6C is a schematic diagram of a recognition circuit according to some other embodiments of the present disclosure.

In some embodiments of the present disclosure as illustrated in FIG. 6B, the first recognition subcircuit 622 is further configured to receive an addition instruction from an acquisition device, and to add the identification information of the target vehicle corresponding to the identification information of a current driver in the second database. Herein the adding instruction is configured to instruct the first recognition subcircuit to add the identification information of the target vehicle corresponding to the identification information of a current driver in the second database In some embodiments of the present disclosure as illustrated in FIG. 6C, the recognition circuit 620 can comprise a fifth processing subcircuit 625, a separation subcircuit 626, a decryption subcircuit 627, a second recognition subcircuit 628, a second control subcircuit 629, and a second execution subcircuit 630.

The fifth processing subcircuit 625 is configured to pre-process the fourth electrical signal to thereby generate a pre-processed fourth electrical signal.

The separation subcircuit 626 is configured to separate the third electrical signal and the encrypted identification electrical signal from the pre-processed fourth electrical signal.

The decryption subcircuit 627 is configured to decrypt the third electrical signal to thereby generate a decrypted third electrical signal. Herein the third electrical signal is converted from a second optical signal by an acquisition device mounted on the target vehicle. The second optical signal is transmitted from a second vehicle immediately behind the target vehicle that corresponds to the identification information of the second vehicle. The second optical signal is transmitted by an optical transmitter (for example, a vehicle lamp) of the second vehicle under control of a modulated electrical signal derived from modulation and encryption of an electrical signal comprising the identification information of the second vehicle.

The decryption subcircuit 627 is further configured to decrypt the encrypted identification electrical signal to thereby obtain a first identification electrical signal.

The second recognition subcircuit 628 is configured to recognize the identification information of the target vehicle and the second vehicle (the vehicle immediately behind the target vehicle) based on the first identification electrical signal and on the decrypted third electrical signal, respectively.

The second control subcircuit 629 is configured, based on the identification information of the target vehicle, to control the second execution subcircuit 630 to perform certain actions, such as to allow or to prohibit the target vehicle to pass through.

The second control subcircuit 629 is further configured, based on the identification information of the second vehicle, to control the second execution subcircuit 630 to perform certain actions, such as to allow or to prohibit the second vehicle to pass through.

The identification information of target vehicle or second vehicle can be a license plate number or VIN of the target vehicle or the second vehicle.

Figure 6D:
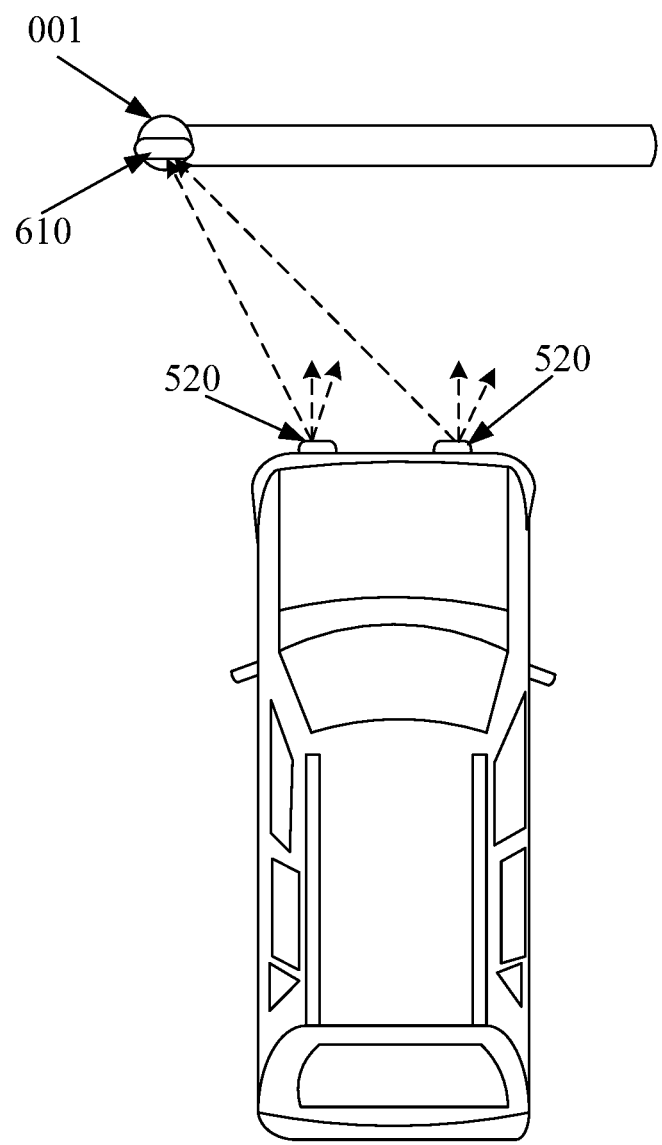
FIG. 6D illustrates an optical signal receiving circuit disposed on a fixed rod according to some other embodiments of the present disclosure.

In some embodiments, the first execution subcircuit and second execution subcircuit can include a gating subportion, such as a cross-bar, a gate, or a garage door, which is configured to allow or prohibit a vehicle to pass by or through. The gating subportion can be disposed at an entrance of a parking lot or a community, or at a toll station. For example, the gating subportion can be a cross-bar, which can comprise a fixed rod or a movable rod, and correspondingly, an optical signal receiving circuit can be disposed at a designated position on the fixed rod or on the movable rod FIG. 6D illustrates one embodiment of arrangement of an optical signal receiving circuit in the vehicle identification system. As shown in the figure, an optical signal receiving circuit 610 is disposed at the designated position of a fixed rod 001. Two optical signal transmitting circuits 520 are disposed on a front side of a vehicle. In addition, an acquisition circuit can also be disposed on the front side of the vehicle (not shown), and a recognition circuit can also be disposed at a designated position of the fixed rod 001 (not shown).

Figure 6E:
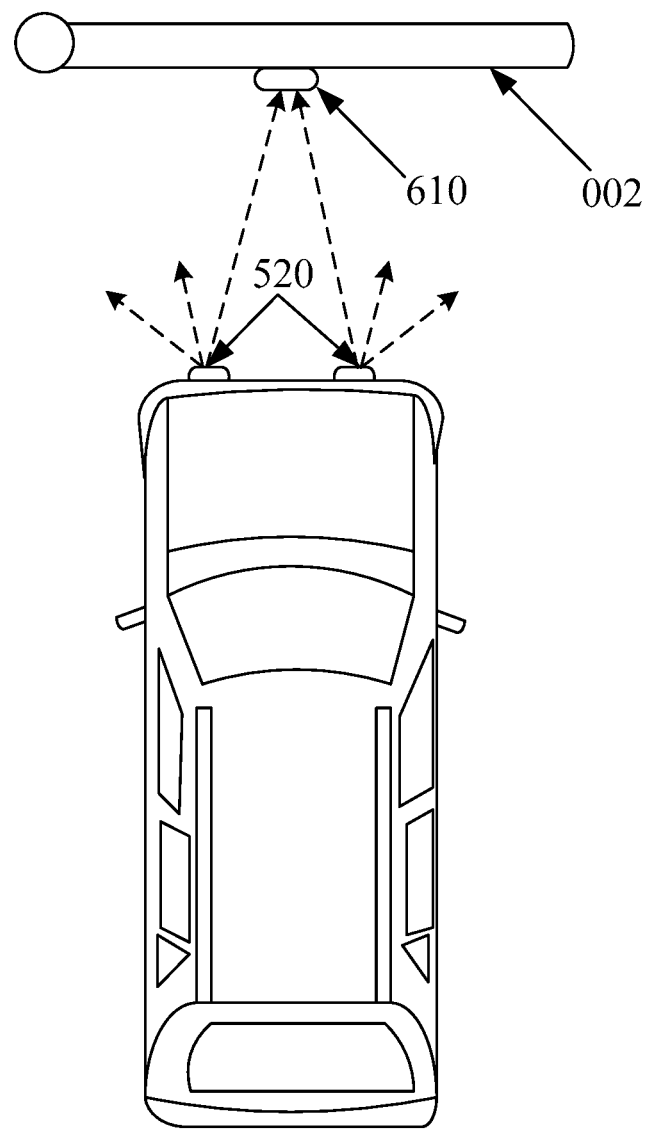
FIG. 6E illustrates an optical signal receiving circuit disposed on a movable rod according to some other embodiments of the present disclosure.

FIG. 6E illustrates another embodiment of arrangement of an optical signal receiving circuit. As shown in the figure, an optical signal receiving circuit 610 is disposed at the designated position of a movable rod 002. Two optical signal transmitting circuits 520 are disposed on a front side of a vehicle. In addition, an acquisition circuit can also be disposed on the front side of the vehicle (not shown), and a recognition circuit can also be disposed at a designated position of the movable rod 002 (not shown).

The optical signal receiving circuit can be a photoelectric sensor, and can be, for example, a photodiode or a complementary metal oxide semiconductor (CMOS) camera. The optical signal receiving circuit can also be other type of photosensing devices. There are no limitations herein.

The recognition device as described above can recognize the identification information of vehicles based on optical signals comprising the identification information of the vehicles transmitted from acquisition devices mounted thereon. Because optical signals typically have a relatively long transmission distance and a relatively strong direction, compared with current technologies, the vehicle identification method that employs the recognition device as described above is thus capable of determining the identification information of a vehicle even when there is a long distance between the vehicle and the recognition device. Thus the time periods required for recognizing multiple vehicles can be shortened, resulting in an increased speed for the multiple vehicles.

In yet another aspect, the present disclosure provides a vehicle identification system, which includes an acquisition device and a recognition device. The acquisition device is disposed on a target vehicle, and can be the one shown in FIG. 5A. The recognition device can be the one shown in FIG. 6A.

The vehicle identification system as described above can recognize the identification information of vehicles based on optical signals comprising the identification information of the vehicles. Because optical signals typically have a relatively long transmission distance and a relatively strong direction, compared with current technologies, the vehicle identification system disclosed herein is thus capable of determining the identification information of a vehicle even when there is a long distance between the vehicle and a recognition device. Thus the time periods required for recognizing multiple vehicles can be shortened, resulting in an increased speed for the multiple vehicles.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An acquisition device mounted on a first vehicle, comprising:
   an acquisition circuit, configured to obtain identification information of the first vehicle; and
   an optical signal transmitting circuit, configured to generate and transmit a first optical signal corresponding to the identification information of the first vehicle to a recognition device, comprising:
   a processing subcircuit;
   an optical signal receiving subcircuit; and
   an optical transmitter,
   wherein:
   the acquisition circuit is further configured to:
     generate a first identification electrical signal based on the identification of the first vehicle;
     encrypt the first identification electrical signal to thereby generate an encrypted first identification electrical signal;
     send the encrypted first identification electrical signal to the optical transmitting circuit; and
     generate a second identification electrical signal based on a third electrical signal from the optical signal receiving subcircuit corresponding to a second vehicle immediately behind the first vehicle and the encrypted first identification electrical signal;
   the optical signal transmitting circuit is configured to:
     generate and transmit a first optical signal corresponding to the identification of the first vehicle based on the encrypted first identification electrical signal;
   the processing subcircuit is configured to:
     modulate the encrypted first identification electrical signal to thereby generate and to send to the optical transmitter a modulated first identification electrical signal;
     modulate the second identification electrical signal to thereby generate a modulated second identification electrical signal;
   the optical signal receiving subcircuit is configured to:
     receive a second optical signal transmitted from and corresponding to identification information of a second vehicle immediately behind the first vehicle; convert the second optical signal into the third electrical signal;
   the optical transmitter is configured to:
     transmit the first optical signal based on the modulated first identification electrical signal;

transmit an optical signal corresponding to the identification information of the first vehicle and the identification of the second vehicle based on the modulated second identification electrical signal.

2. The acquisition device of claim 1, wherein the identification information of the first vehicle comprises at least one of code information of the first vehicle or identification information of a first driver on the first vehicle.

3. The acquisition device of claim 2, wherein:
the code information of the first vehicle comprises at least one of a license plate number associated with the first vehicle or a vehicle identification number (VIN) associated with the first vehicle; and
the identification information of the first driver on the first vehicle comprises at least one of fingerprint information, iris information, or voice information.

4. The acquisition device of claim 3, wherein the identification information of the first vehicle comprises both the code information of the first vehicle and the identification information of the first driver on the first vehicle, wherein:
the acquisition circuit comprises:
at least one processing subcircuit, configured to convert the code information of the first vehicle into a first electrical signal, and to convert the identification information of the first driver on the first vehicle into a second electrical signal; and
a combining subcircuit, configured to generate the first identification electrical signal based on the first electrical signal and the second electrical signal received from the at least one processing subcircuit.

5. The acquisition device of claim 4, wherein the at least one processing subcircuit comprises:
a first processing subcircuit, configured to convert the code information of the first vehicle into the first electrical signal; and
a second processing subcircuit, configured to convert the identification information of the first driver on the first vehicle into a second electrical signal.

6. The acquisition device of claim 2, wherein the identification information of the first vehicle comprises both the code information of the first vehicle and the identification information of the first driver on the first vehicle, wherein:
the acquisition circuit comprises a processing subcircuit, configured to combine the code information of the first vehicle and the identification information of the first driver on the first vehicle to thereby obtain combined identification information of the first vehicle, wherein the first identification electrical signal is generated based on the combined identification information of the first vehicle.

7. The acquisition device of claim 2, wherein the identification information of the first vehicle comprises the identification information of the first driver on the first vehicle, wherein:
the acquisition circuit comprises an acquisition subportion, a recognition subportion, and a converting subportion, wherein:
the acquisition subportion is configured to obtain, and to send to the recognition subportion, the identification information of the first driver on the first vehicle;
the recognition subportion is configured:
to query the identification information of the first driver in a first database comprising at least one record of identification information of at least one driver, wherein each record corresponds to each driver; and to send the identification information of the first driver on the first vehicle to the converting subportion if the identification information of the first driver matches with any record in the first database; and
the converting subportion is configured to convert the identification information of the first driver on the first vehicle into an electrical signal corresponding to the identification information of the first driver on the first vehicle.

8. The acquisition device of claim 7, wherein the recognition subportion is further configured, if the identification of the first driver fails to match with any record in the first database:
to send a control signal to a controller of the first vehicle such that the controller prohibits the first vehicle from being started upon receiving the control signal; or
to generate, and to send to a mobile terminal associated with a second driver whose identification information is in the first database, an authorization prompt such that the second driver determines whether or not to authorize the first driver for driving the first vehicle, and to add a record of the identification information of the first driver in the first database upon receiving an authorization message from the mobile terminal.

9. A recognition device for determining identification information of a first vehicle equipped with the acquisition device of claim 1, comprising:
an optical signal receiving circuit, configured to receive a first optical signal emitted from the first vehicle; and
a recognition circuit, configured to determine the identification information of the first vehicle based on the first optical signal.

10. The recognition device of claim 9, wherein:
the optical signal receiving circuit is further configured to convert the first optical signal to a fourth electrical signal; and
the recognition circuit is further configured to determine the identification information of the first vehicle based on the fourth electrical signal.

11. The recognition device of claim 10, wherein the recognition circuit comprises a first recognition subcircuit, a first control subcircuit, and a first execution subcircuit, wherein:
the first recognition subcircuit is configured to determine the identification information of the first vehicle based on the fourth electrical signal; and
the first control subcircuit is configured to control the first execution subcircuit to perform a first action based on the identification information of the first vehicle.

12. The recognition device of claim 11, wherein:
the first recognition subcircuit is configured to extract ID information based on the fourth electrical signal, to query the ID information in a second database comprising at least one record of initial identification information of at least one vehicle, wherein each record corresponding to each vehicle, and to generate an instruction based on whether or not the ID information matches with any record in the second database; and
the first control subcircuit is configured, upon receiving the instruction from the first recognition subcircuit, to control the first execution subcircuit to perform the first action.

13. The recognition device of claim 12, wherein the first recognition subcircuit comprises a gating subportion, configured to allow or prohibit a vehicle to pass by or through.

14. The recognition device of claim 10, wherein the recognition circuit comprises a separation subcircuit and a second recognition subcircuit, wherein:
the separation subcircuit is configured to obtain one electrical signal corresponding to the first vehicle and another electrical signal corresponding to a second vehicle based on the fourth electrical signal; and
the second recognition subcircuit is configured to determine the identification information of the first vehicle and the identification information of the second vehicle based respectively on the one electrical signal corresponding to the first vehicle and the another electrical signal corresponding to the second vehicle.

15. The recognition device of claim 14, wherein the recognition circuit further comprises a second control subcircuit and a second execution subcircuit, wherein the second control subcircuit is configured to control the second execution subcircuit to perform a second action based on the identification information of the first vehicle and the identification information of the second vehicle.

16. A vehicle identification system, comprising an acquisition device according to claim 1 and a recognition device, wherein:
the recognition device comprises an optical signal receiving circuit and a recognition circuit, wherein the optical signal receiving circuit is configured to receive the first optical signal emitted from the first vehicle; and the recognition circuit is configured to determine the identification information of the first vehicle based on the first optical signal.

17. A vehicle identification method utilizing optical signal transmitting and receiving devices, comprising:
generating a first vehicle identification electrical signal based on the identification information of a first vehicle;
encrypting the first vehicle identification electrical signal to obtain an encrypted first vehicle identification electrical signal;
receiving a second optical signal transmitted from a second vehicle immediately behind the first vehicle said second optical signal corresponds to the identification of the second vehicle;
generating a third identification electrical signal based on the second optical signal;
generating a first identification electrical signal based on the third identification electrical signal and the encrypted first vehicle identification electrical signal;
generating a first optical signal corresponding to identification information of the first vehicle based on the first identification electrical signal;
transmitting the first optical signal corresponding to identification information of the first vehicle to an optical signal receiver; and
determining the identification information of the first vehicle based on the first optical signal received.

18. The vehicle identification method of claim 17, wherein the generating the first optical signal based on the first identification electrical signal comprises:
modulating the first identification electrical signal to obtain a modulated first identification electrical signal; and
generating the first optical signal based on the modulated first identification electrical signal.

19. The vehicle identification method of claim 17, wherein the identification information of the first vehicle comprises at least one of code information of the first vehicle or identification information of a first driver on the first vehicle.

20. The vehicle identification method of claim 19, wherein:
the code information of the first vehicle comprises at least one of a license plate number associated with the first vehicle or a vehicle identification number (VIN) associated with the first vehicle; and
the identification information of the first driver on the first vehicle comprises at least one of fingerprint information, iris information, or voice information.

21. The vehicle identification method of claim 19, wherein the identification information of the first vehicle comprises both the code information of the first vehicle and the identification information of the first driver on the first vehicle, wherein the generating a first identification electrical signal based on the identification information of the first vehicle comprises:
generating a first electrical signal and a second electrical signal based respectively on the code information of the first vehicle and the identification information of the first driver on the first vehicle; and
generating the first identification electrical signal based on the first electrical signal and the second electrical signal.

22. The vehicle identification method of claim 19, wherein the identification information of the first vehicle comprises both the code information of the first vehicle and the identification information of the first driver on the first vehicle, wherein the generating a first identification electrical signal based on the identification information of the first vehicle comprises:
combining the code information of the first vehicle and the identification information of the first driver on the first vehicle to thereby obtain combined identification information of the first vehicle; and
generating the first identification electrical signal based on the combined identification information of the first vehicle.

23. The vehicle identification method of claim 19, wherein the identification information of the first vehicle comprises the identification information of the first driver on the first vehicle, wherein:
the vehicle identification method further comprises, prior to the generating a first identification electrical signal based on the identification information of the first vehicle:
obtaining the identification information of the first driver on the first vehicle; and
querying the identification information of the first driver on the first vehicle in a first database comprising at least one record of identification information of at least one driver, wherein each record corresponds to each driver.

24. The vehicle identification method of claim 23, wherein the identification information of the first driver on the first vehicle matches with any record in the first database, wherein:
the generating a first identification electrical signal based on the identification information of the first vehicle comprises:
generating a second electrical signal based on the identification information of the first driver on the first vehicle.

25. The vehicle identification method of claim 23, wherein the identification information of the first driver on the first vehicle fails to match with any record in the first database, wherein:
the vehicle identification method further comprises:
prohibiting the first driver from starting the first vehicle; or
authorizing the first driver to drive the first vehicle.

26. The vehicle identification method of claim 25, wherein the authorizing the first driver to drive the first vehicle comprises:
generating an authorization prompt;
sending the authorization prompt to a mobile terminal associated with a second driver, wherein the first database comprises a record of identification information of the second driver; and
adding a record of the identification information of the first driver in the first database upon receiving an authorization message from the mobile terminal.

27. The vehicle identification method of claim 17, wherein the determining the identification information of the first vehicle based on the first optical signal comprises:
generating a fourth electrical signal based on the first optical signal; and
determining the identification information of the first vehicle based on the fourth electrical signal.

28. The vehicle identification method of claim 27, wherein the determining the identification information of the first vehicle based on the fourth electrical signal comprises:
obtaining ID information from the fourth electrical signal; and
determining the identification information of the first vehicle by querying the ID information in a second database comprising at least one record of initial identification information of at least one vehicle, wherein each record corresponds to each vehicle.

29. The vehicle identification method of claim 27, wherein the determining the identification information of the first vehicle based on the fourth electrical signal comprises:
obtaining one electrical signal corresponding to the first vehicle and another electrical signal corresponding to a second vehicle based on the fourth electrical signal; and
determining the identification information of the first vehicle and the identification information of the second vehicle based respectively on the one electrical signal corresponding to the first vehicle and the another electrical signal corresponding to the second vehicle.

* * * * *